(12) United States Patent
Yamashita et al.

(10) Patent No.: US 11,927,032 B2
(45) Date of Patent: Mar. 12, 2024

(54) AUTOMATIC ANALYSIS DEVICE

(71) Applicant: HITACHI HIGH-TECH CORPORATION, Tokyo (JP)

(72) Inventors: Taichiro Yamashita, Tokyo (JP); Takenori Okusa, Tokyo (JP); Susumu Sakairi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 817 days.

(21) Appl. No.: 16/981,561

(22) PCT Filed: Feb. 13, 2019

(86) PCT No.: PCT/JP2019/005147
§ 371 (c)(1),
(2) Date: Sep. 16, 2020

(87) PCT Pub. No.: WO2019/225075
PCT Pub. Date: Nov. 28, 2019

(65) Prior Publication Data
US 2021/0062553 A1 Mar. 4, 2021

(30) Foreign Application Priority Data
May 22, 2018 (JP) .................. 2018-097534

(51) Int. Cl.
*E05B 65/52* (2006.01)
*E05B 47/00* (2006.01)
(Continued)

(52) U.S. Cl.
CPC ...... *E05B 65/5276* (2013.01); *E05B 47/0002* (2013.01); *E05C 3/008* (2013.01);
(Continued)

(58) Field of Classification Search
None
See application file for complete search history.

(56) References Cited

U.S. PATENT DOCUMENTS

2013/0084212 A1 4/2013 Kurono et al.
2018/0037394 A1 2/2018 Seiders et al.

FOREIGN PATENT DOCUMENTS

JP 51-16173 A 4/1976
JP 03-77799 U 8/1992
(Continued)

OTHER PUBLICATIONS

Supplementary European Search Report issued in corresponding European Application No. 19807151.6 dated Feb. 7, 2022.
(Continued)

*Primary Examiner* — Paul S Hyun
(74) *Attorney, Agent, or Firm* — Mattingly & Malur, PC

(57) ABSTRACT

An automated analysis device is provided with a casing accommodating an analysis device. A cover is axially supported with freedom to pivot, between a closed position and an upwardly-open open position, about a support shaft provided at one side of the casing. A closing device is capable of inhibiting opening of the cover in the closed position, and is provided with a projecting portion that protrudes from a front surface of the cover toward the rear, a lock lever which is axially supported with freedom to pivot about a pivoting support shaft, and which pivots from the work surface in a direction approaching the projecting portion to engage with the projection portion, thereby inhibiting opening of the cover. A safety cover can thus be locked securely.

4 Claims, 17 Drawing Sheets

(51) Int. Cl.
*E05C 3/00* (2006.01)
*G01N 35/00* (2006.01)
*G01N 37/00* (2006.01)

(52) U.S. Cl.
CPC ........ *G01N 35/00* (2013.01); *E05Y 2201/462* (2013.01); *E05Y 2201/624* (2013.01); *E05Y 2201/716* (2013.01); *E05Y 2201/722* (2013.01); *E05Y 2900/602* (2013.01); *G01N 2035/00306* (2013.01)

(56) References Cited

FOREIGN PATENT DOCUMENTS

| | | |
|---|---|---|
| JP | 11-238373 A | 8/1999 |
| JP | 2000-206120 A | 7/2000 |
| JP | 2008-21617 A | 9/2008 |
| JP | 2008-216173 A | 9/2008 |
| JP | 2012-26814 A | 2/2012 |
| JP | 2013-076678 A | 4/2013 |

OTHER PUBLICATIONS

International Preliminary Report on Patentability received in corresponding International Application No. PCT/JP2019/005147 dated Dec. 3, 2020.
International Search Report of PCT/JP2019/005147 dated Apr. 23, 2019.

[FIG. 1]
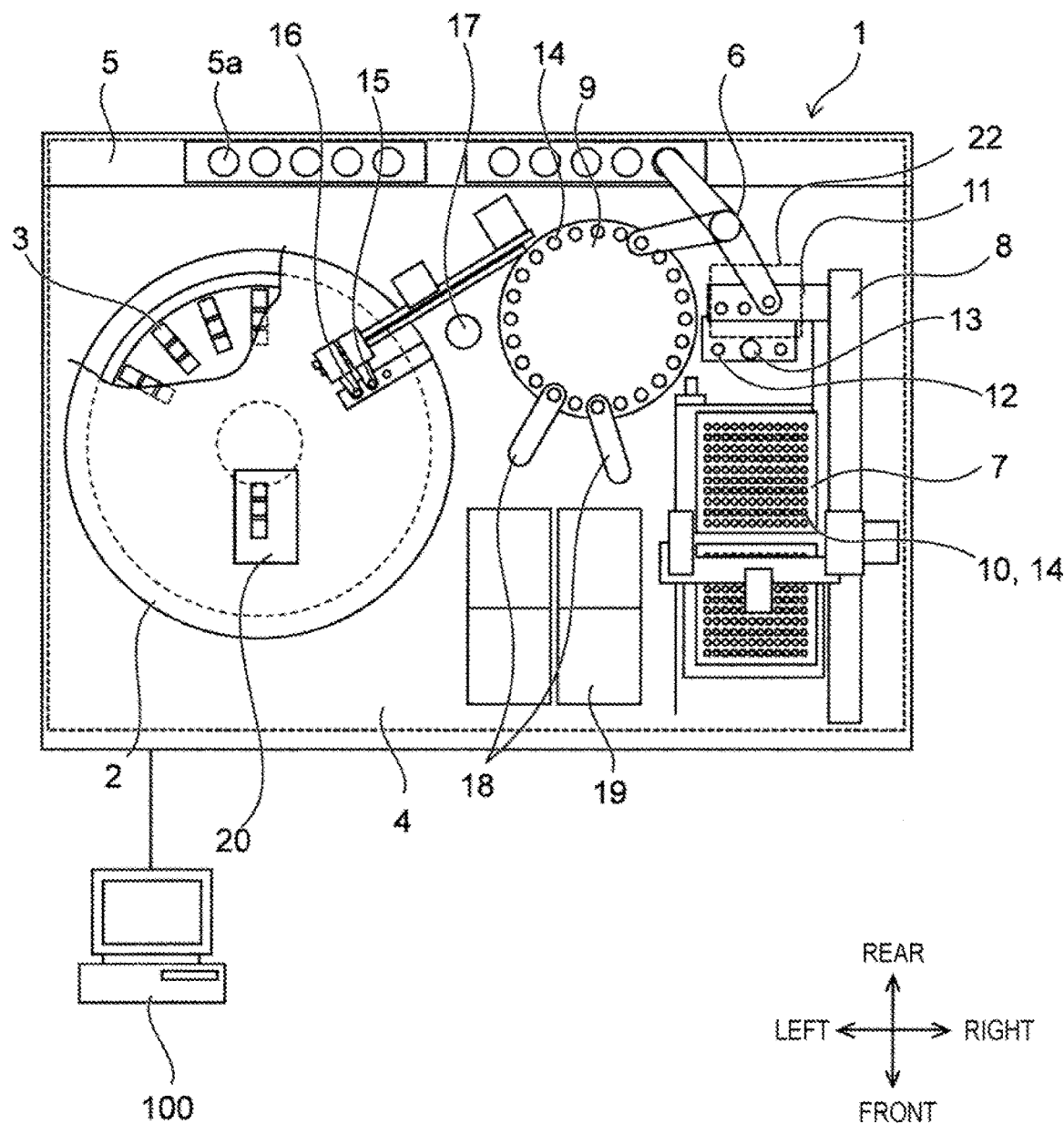

[FIG. 2]
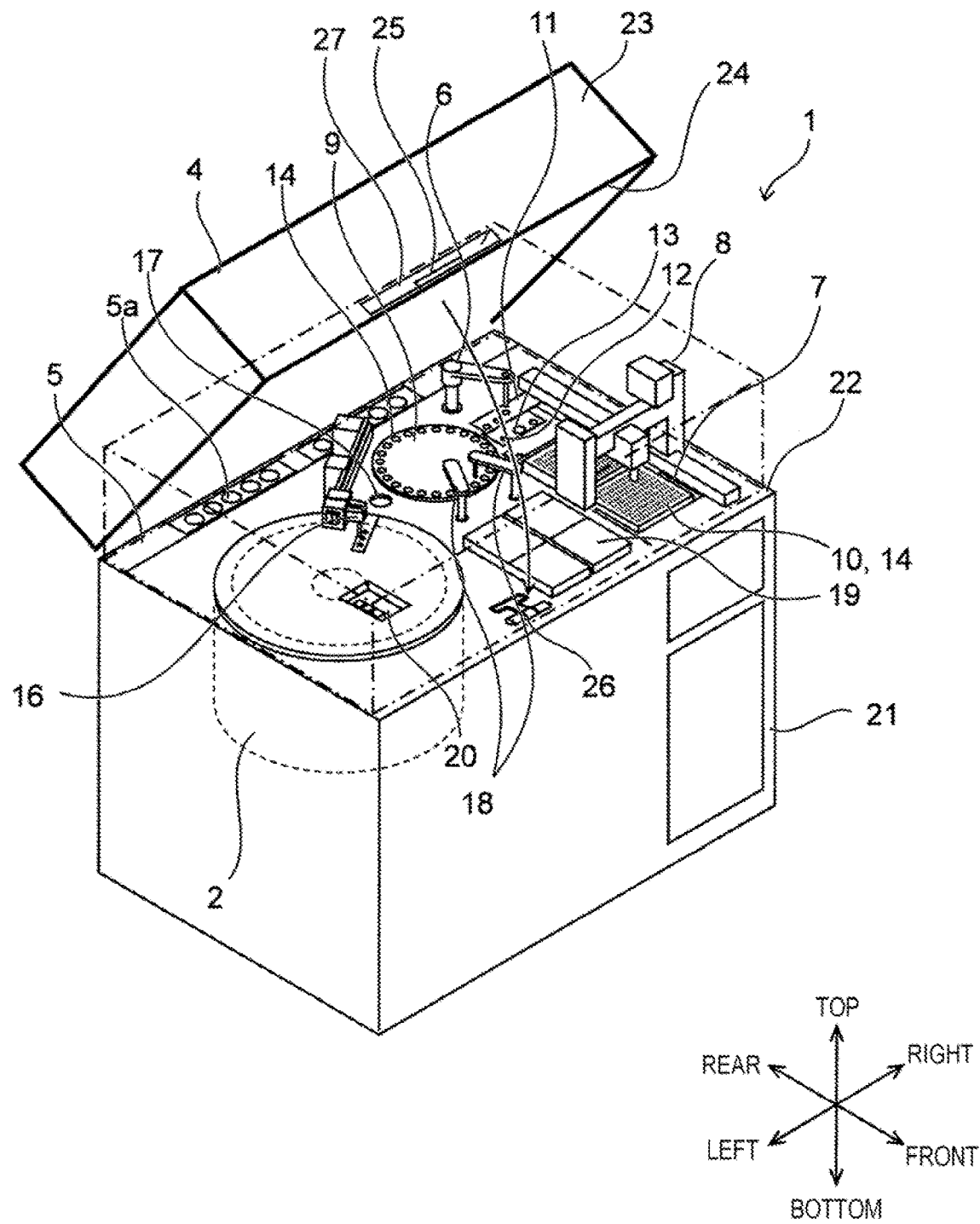

[FIG. 3]
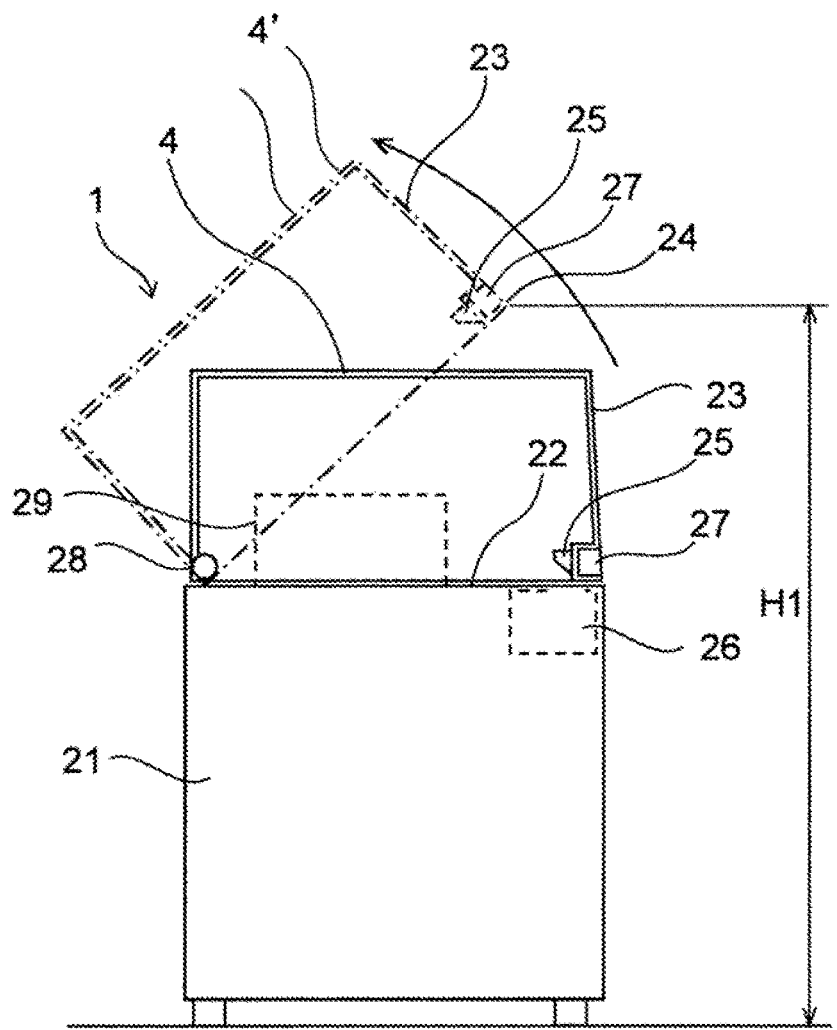
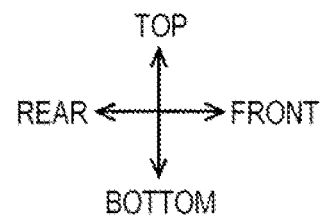

[FIG. 4A]
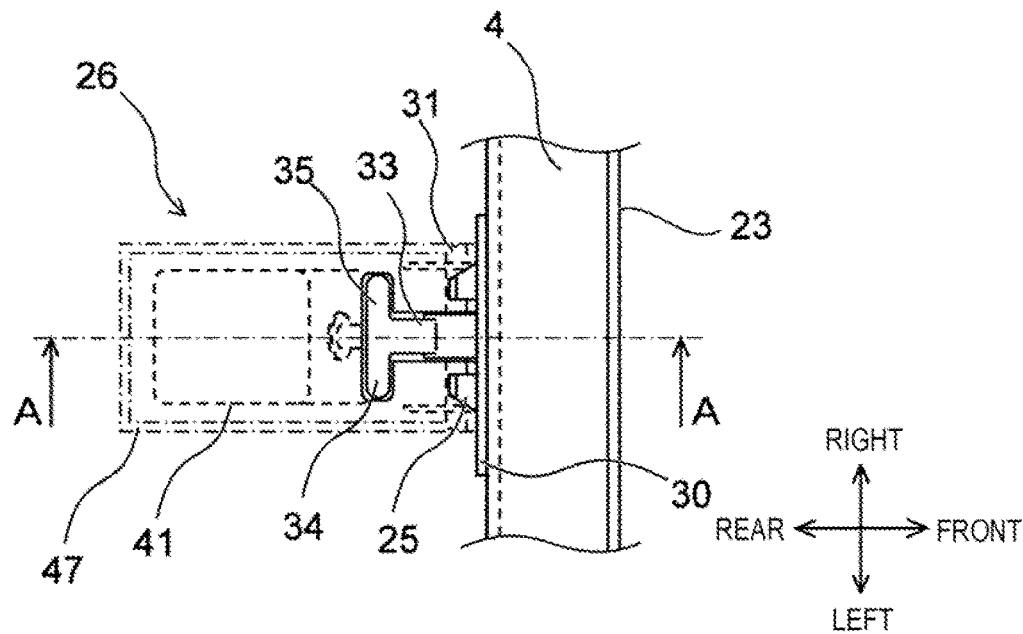
[FIG. 4B]
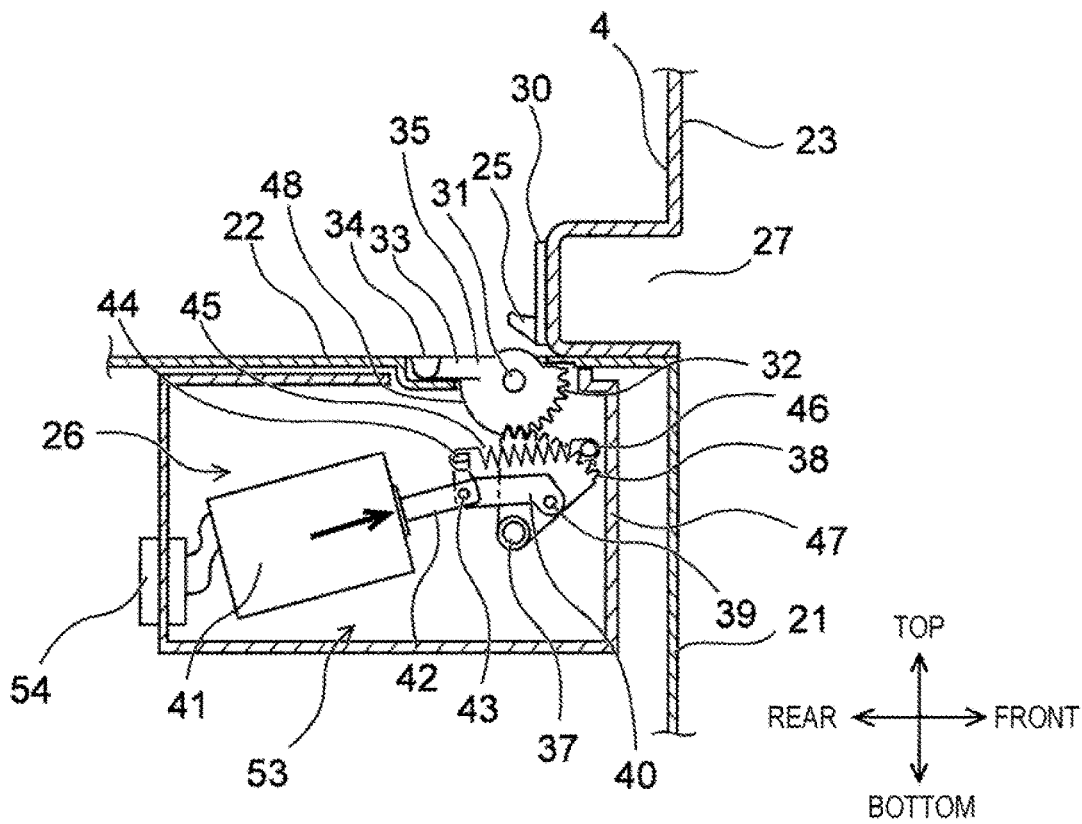

[FIG. 5]
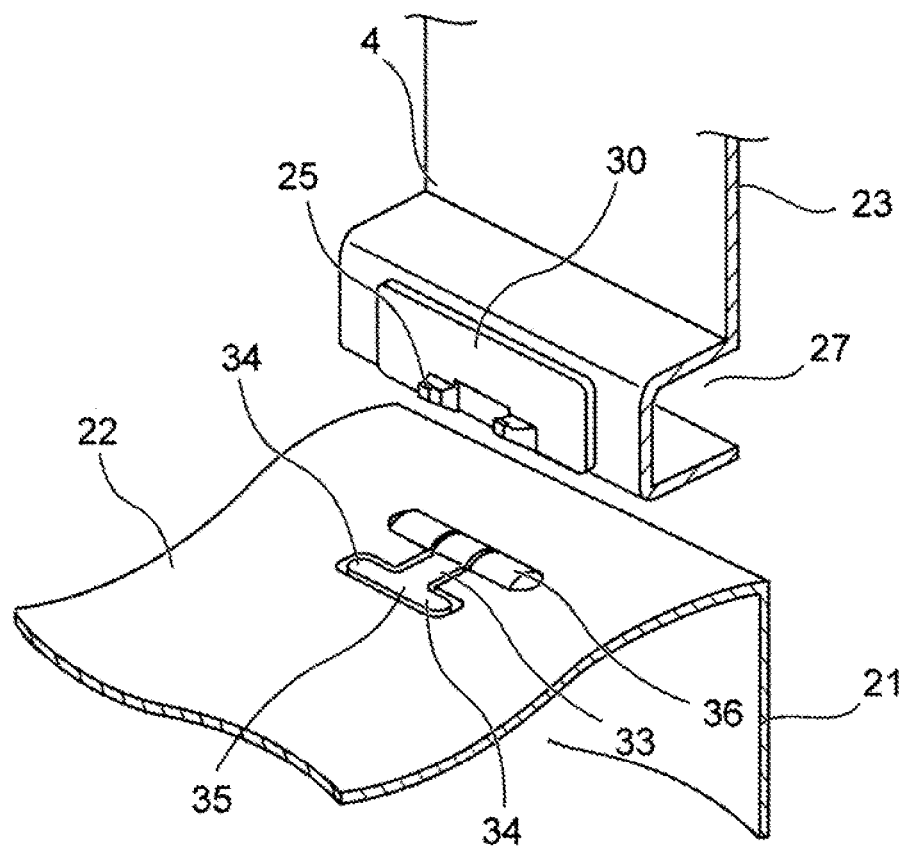
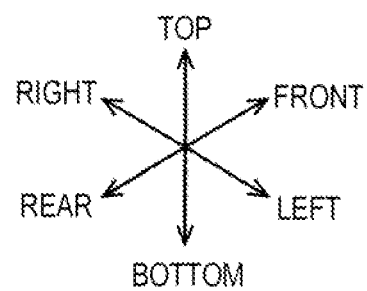

[FIG. 6]
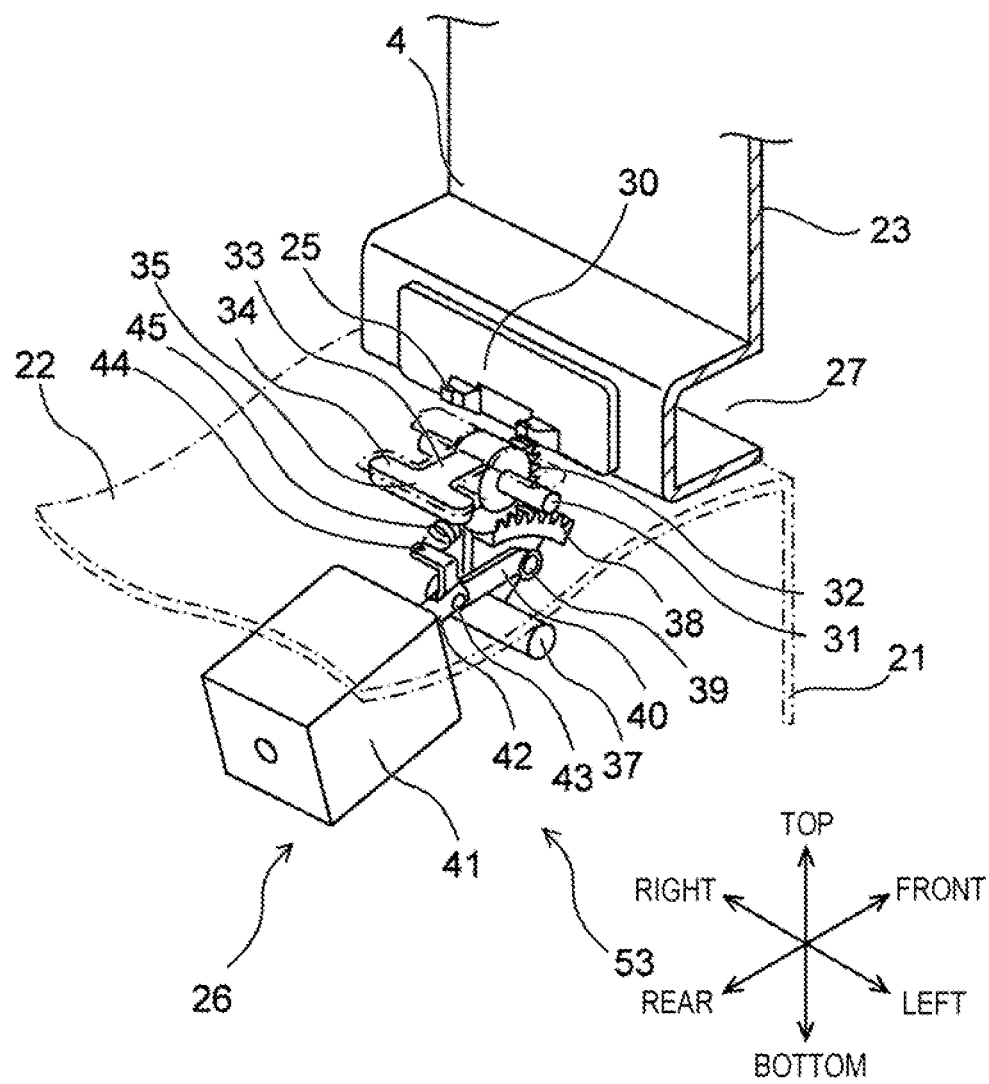

[FIG. 7]
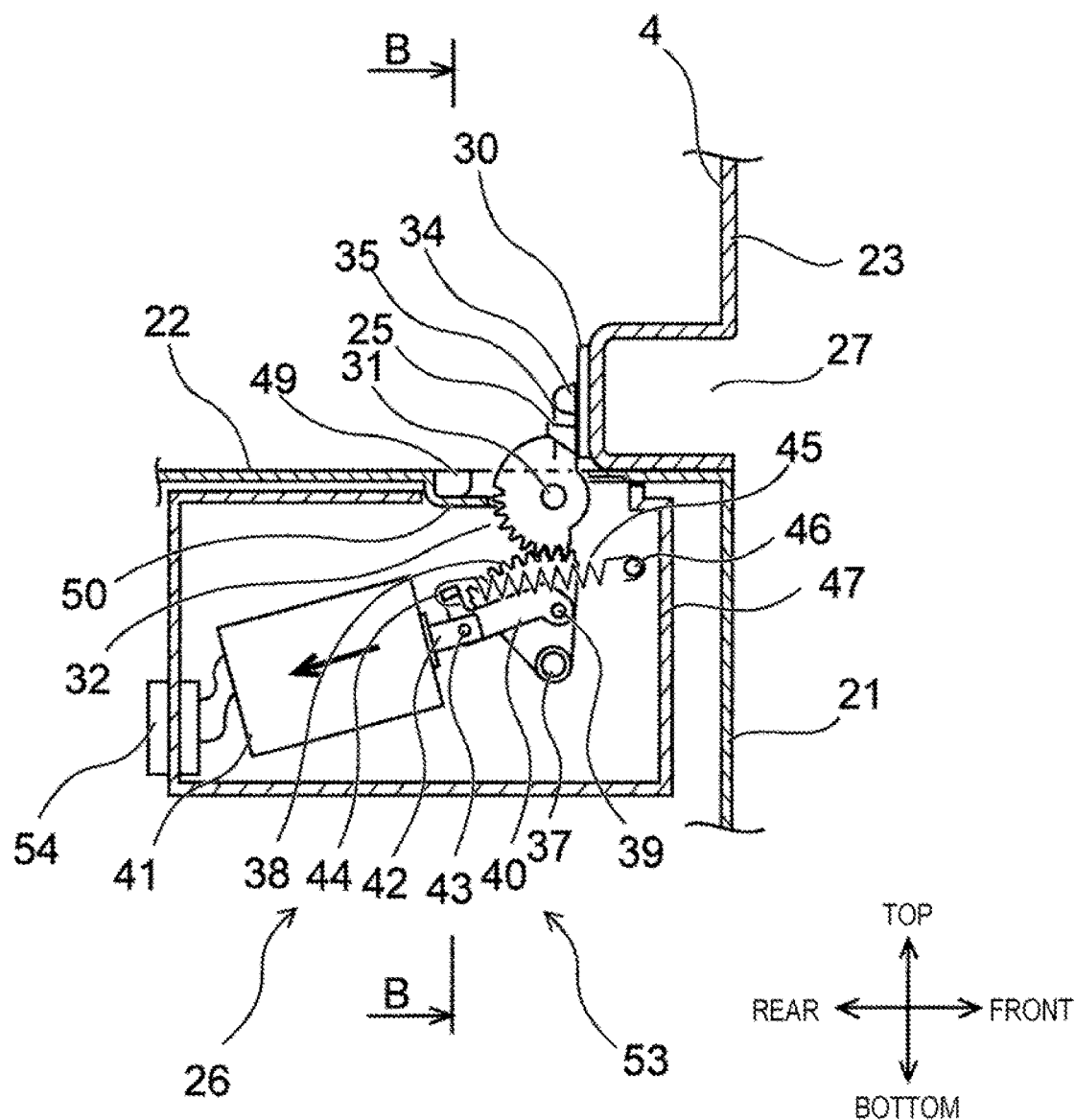

[FIG. 8]
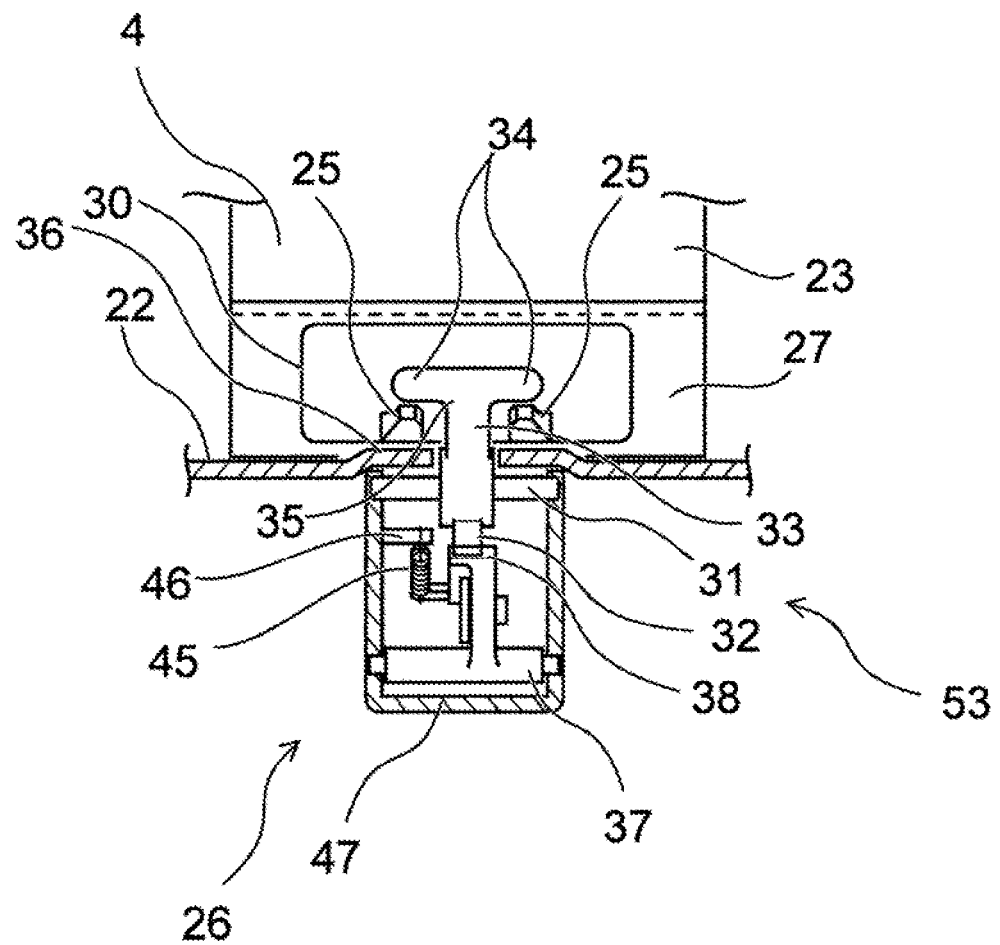
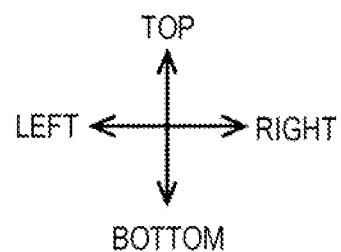

[FIG. 9]
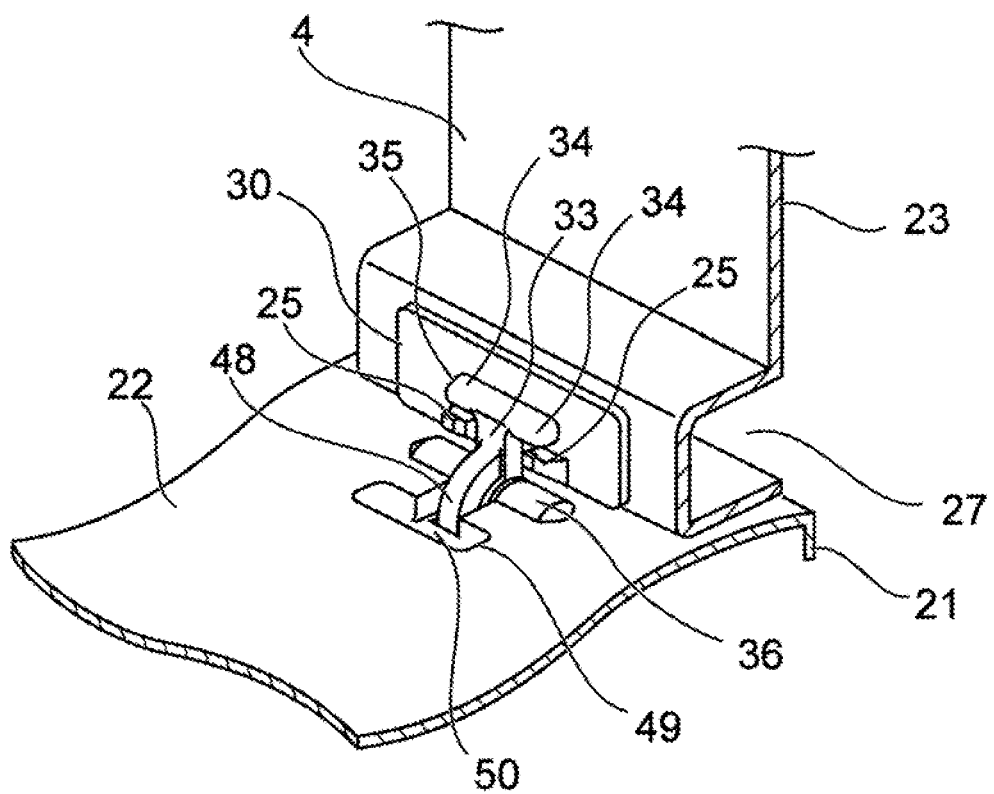
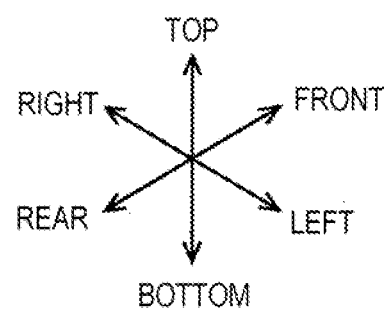

[FIG. 10]
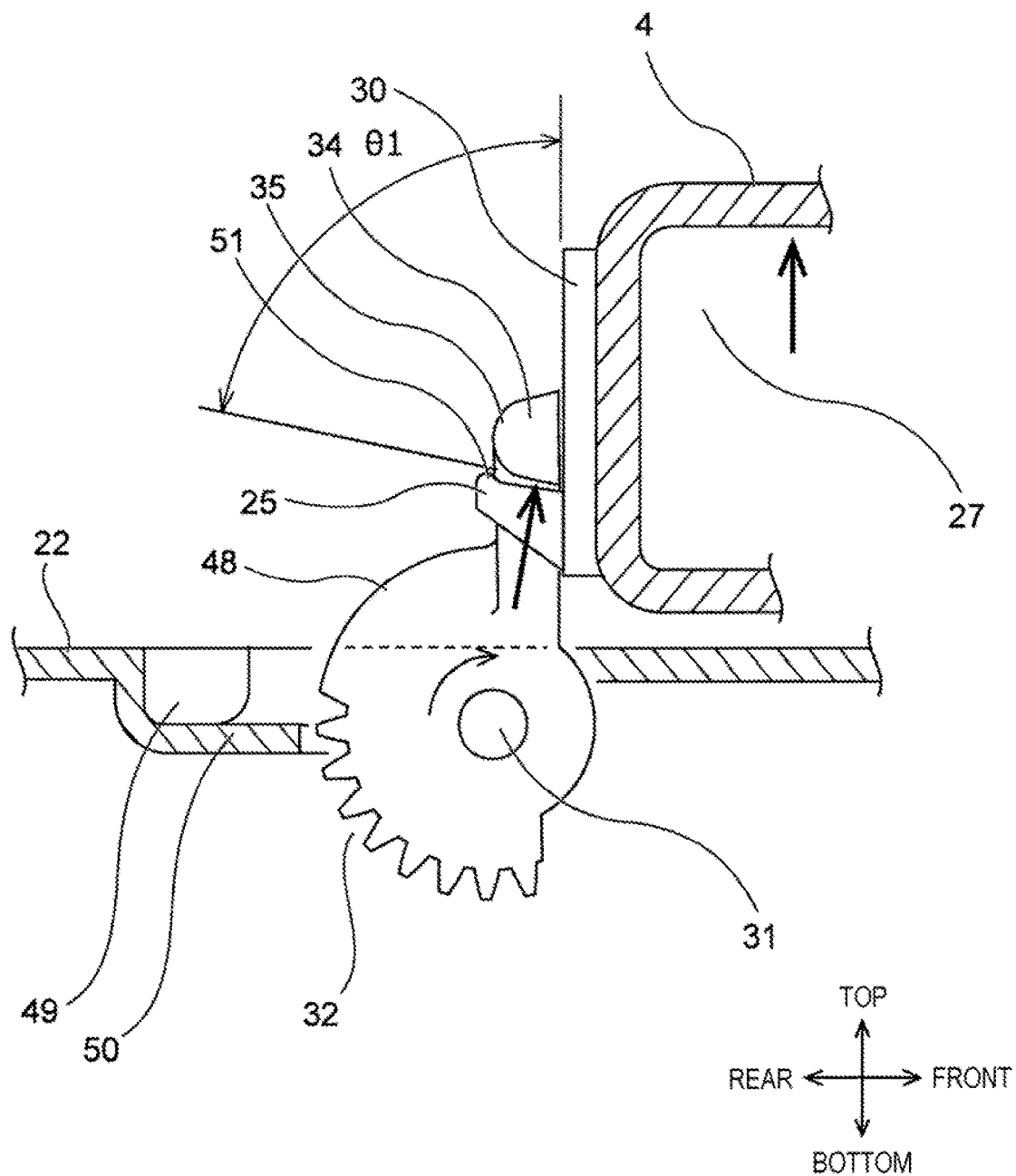

[FIG. 11]
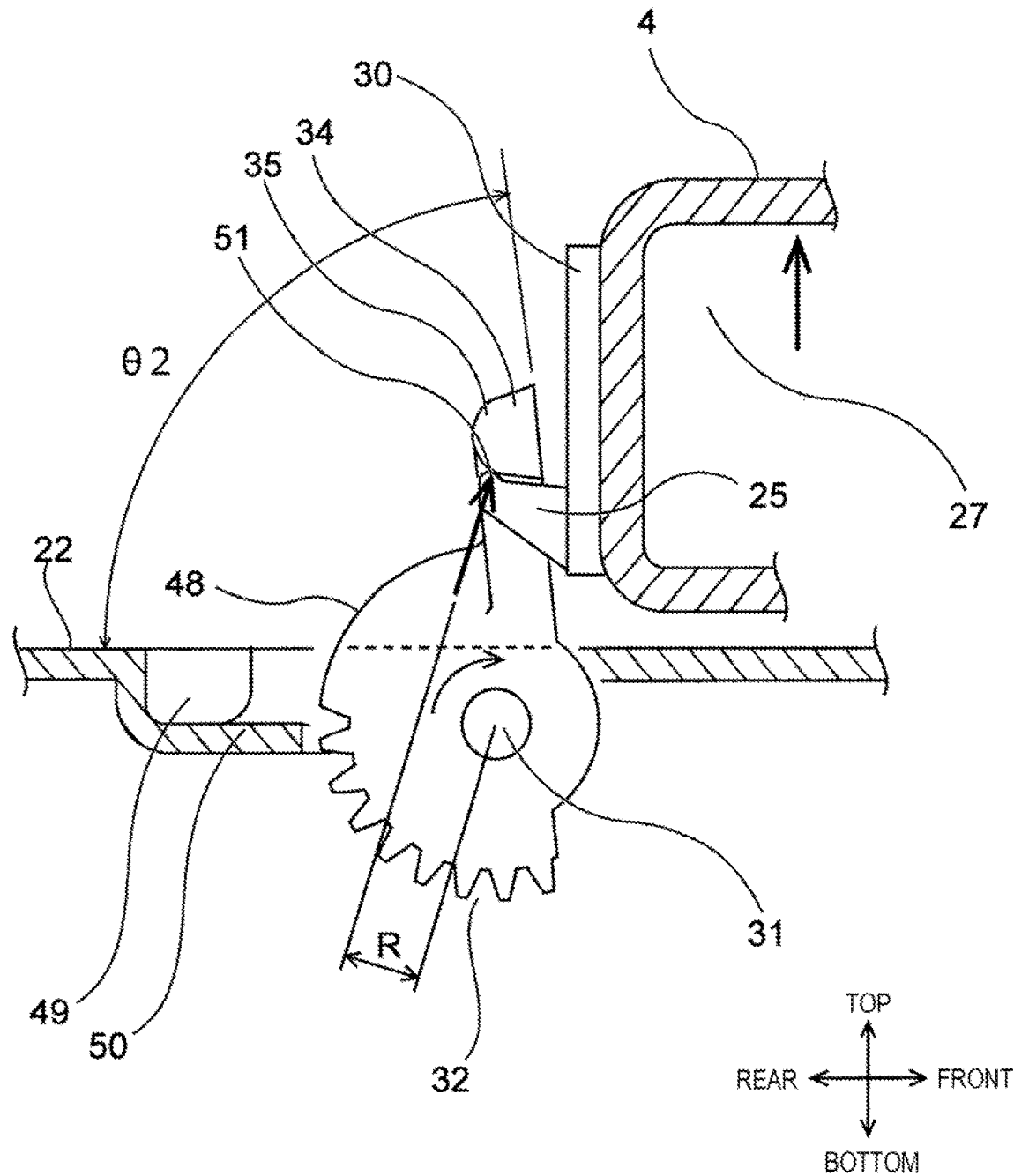

[FIG. 12A]
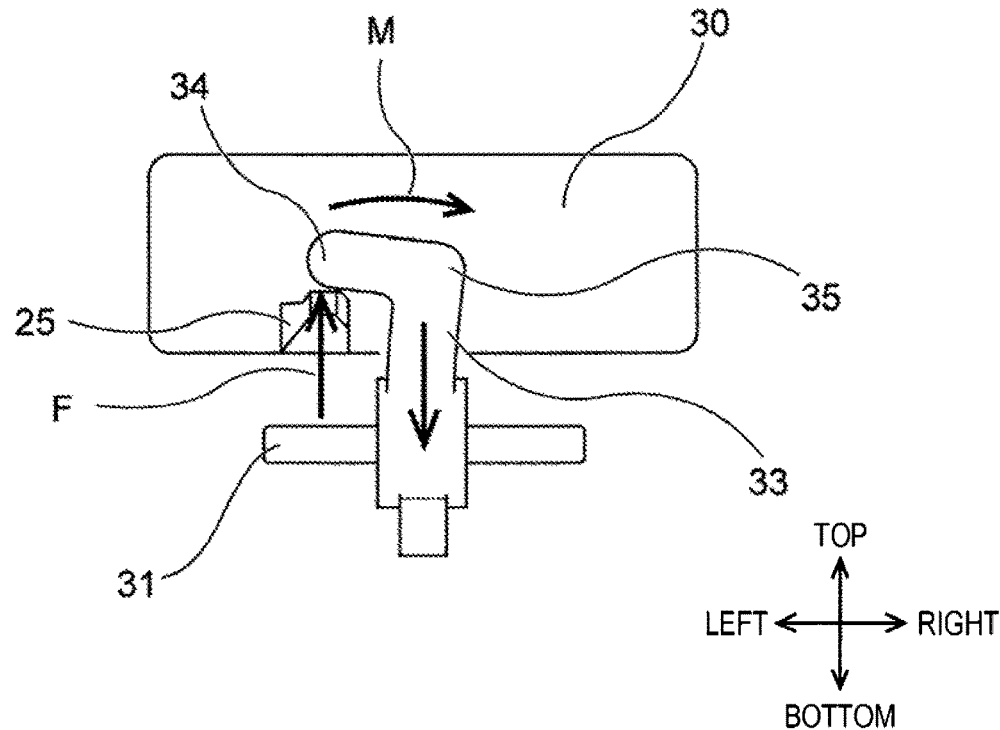
[FIG. 12B]
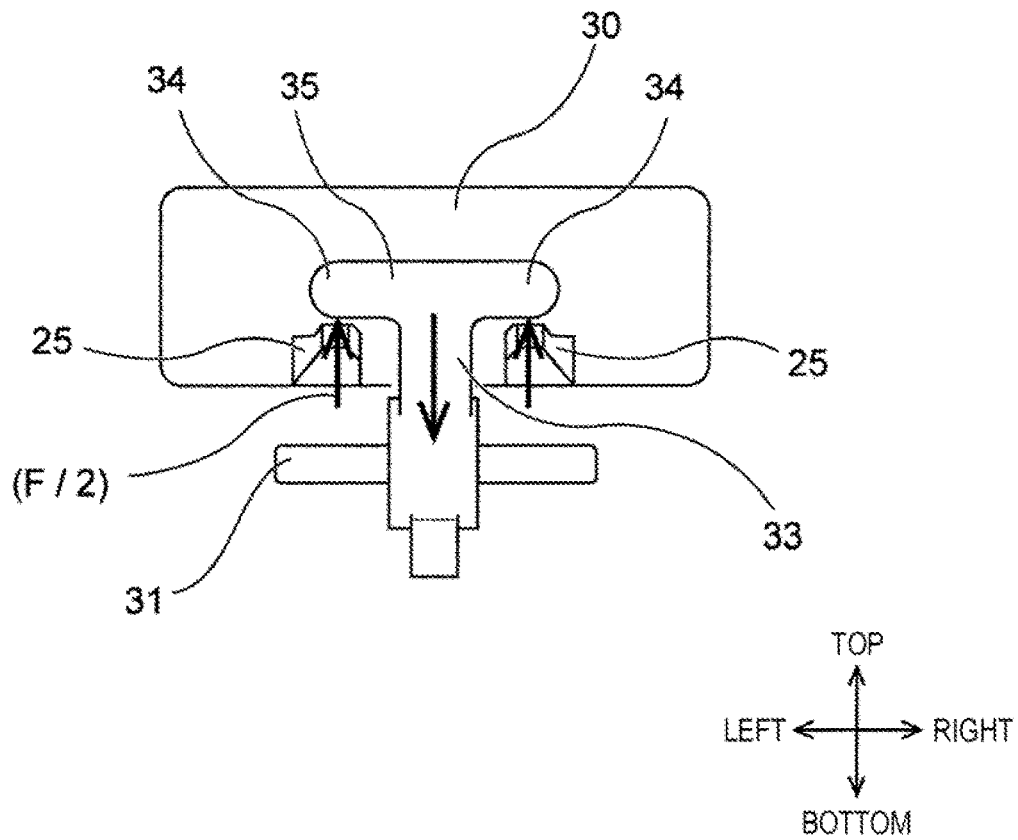

[FIG. 13]
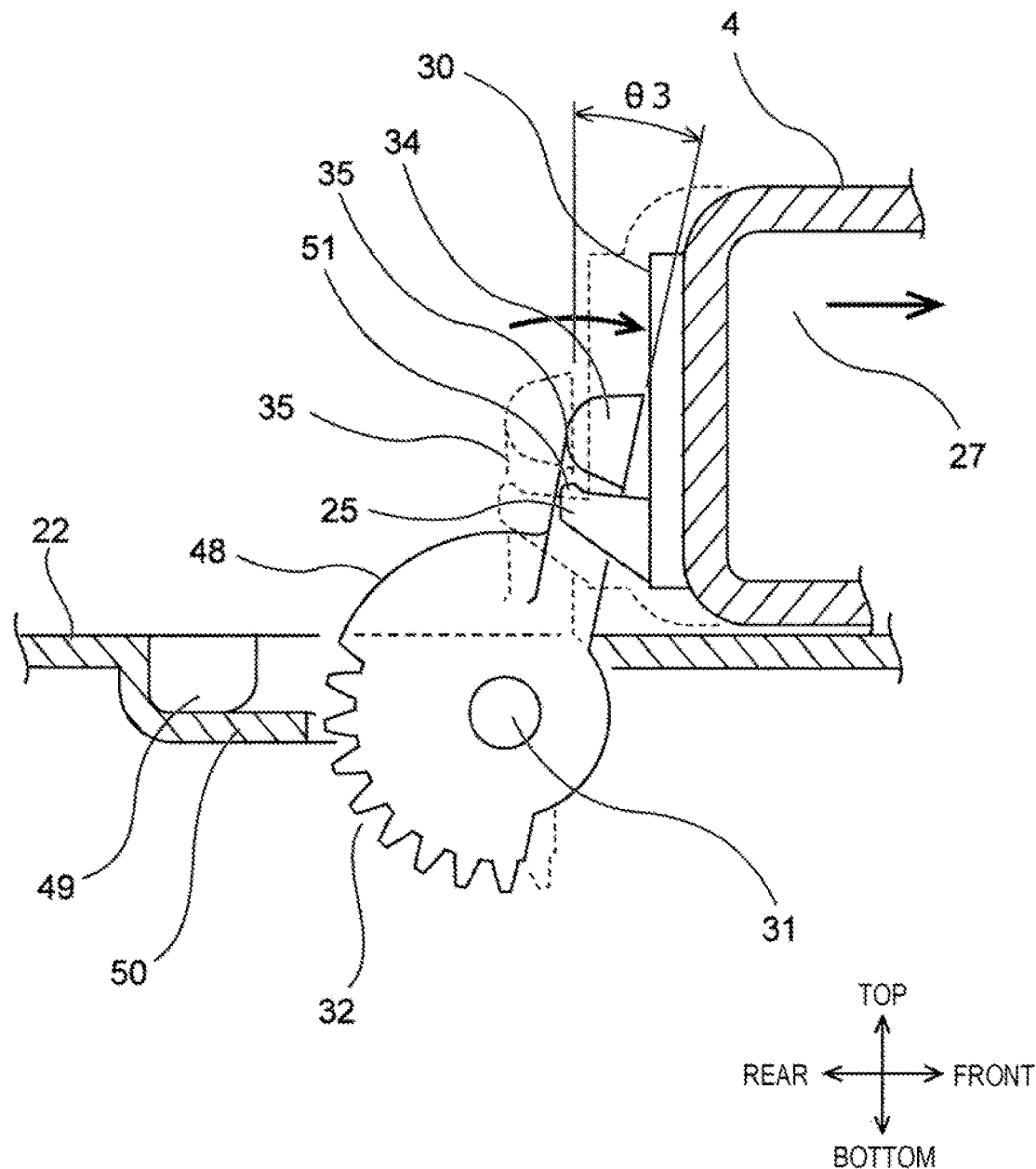

[FIG. 14]
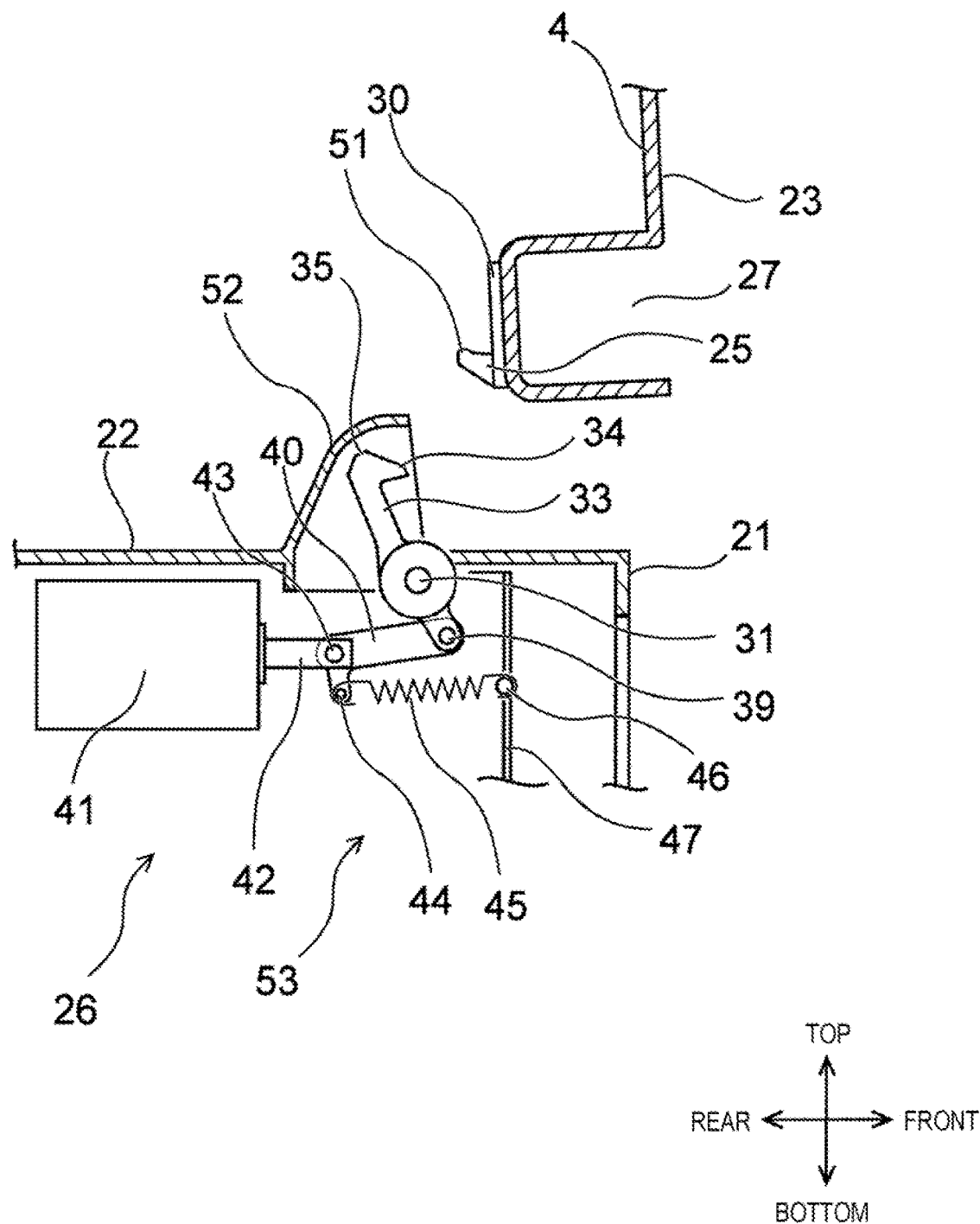

[FIG. 15]
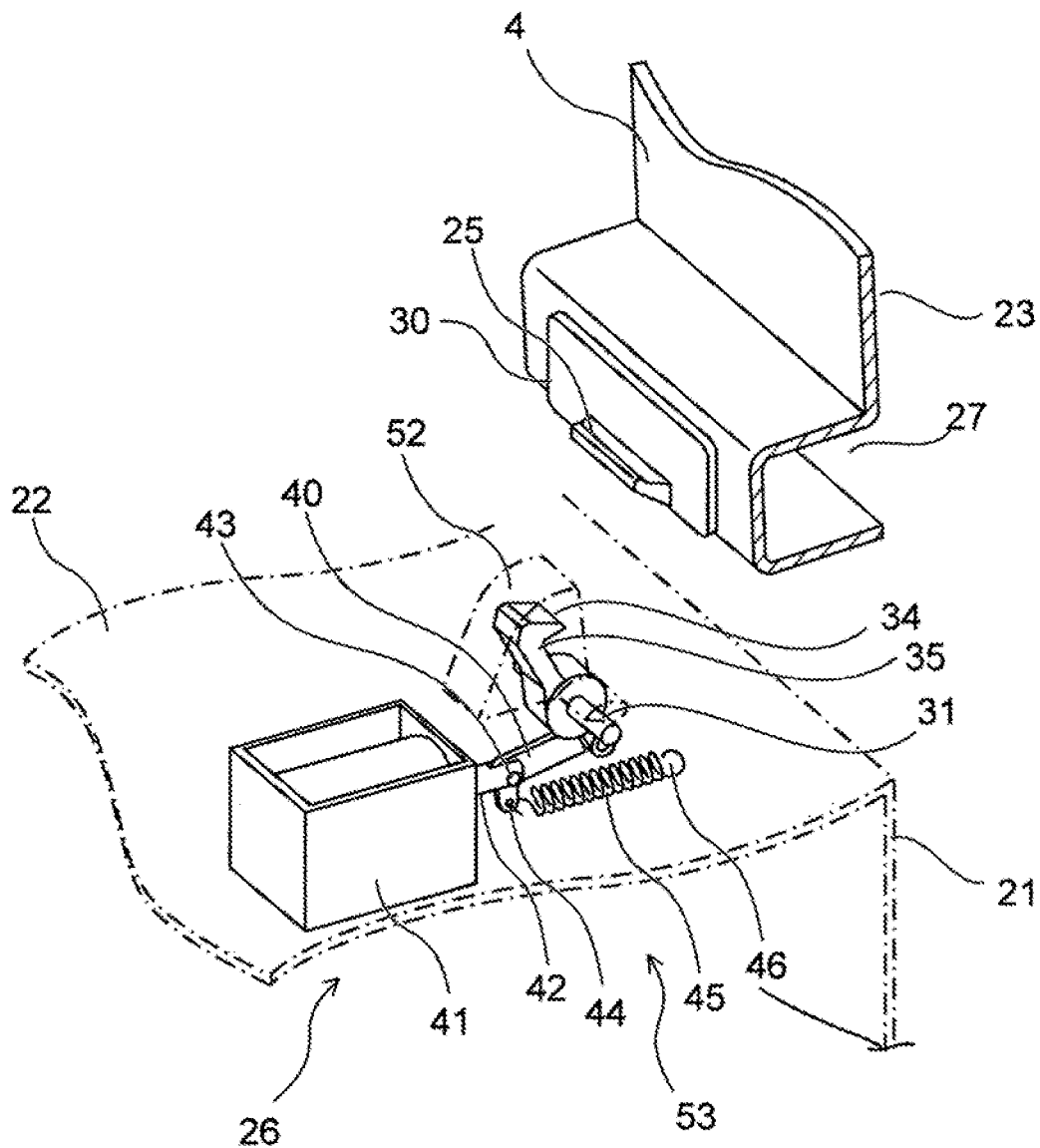
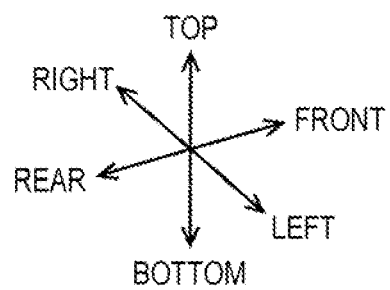

[FIG. 16]
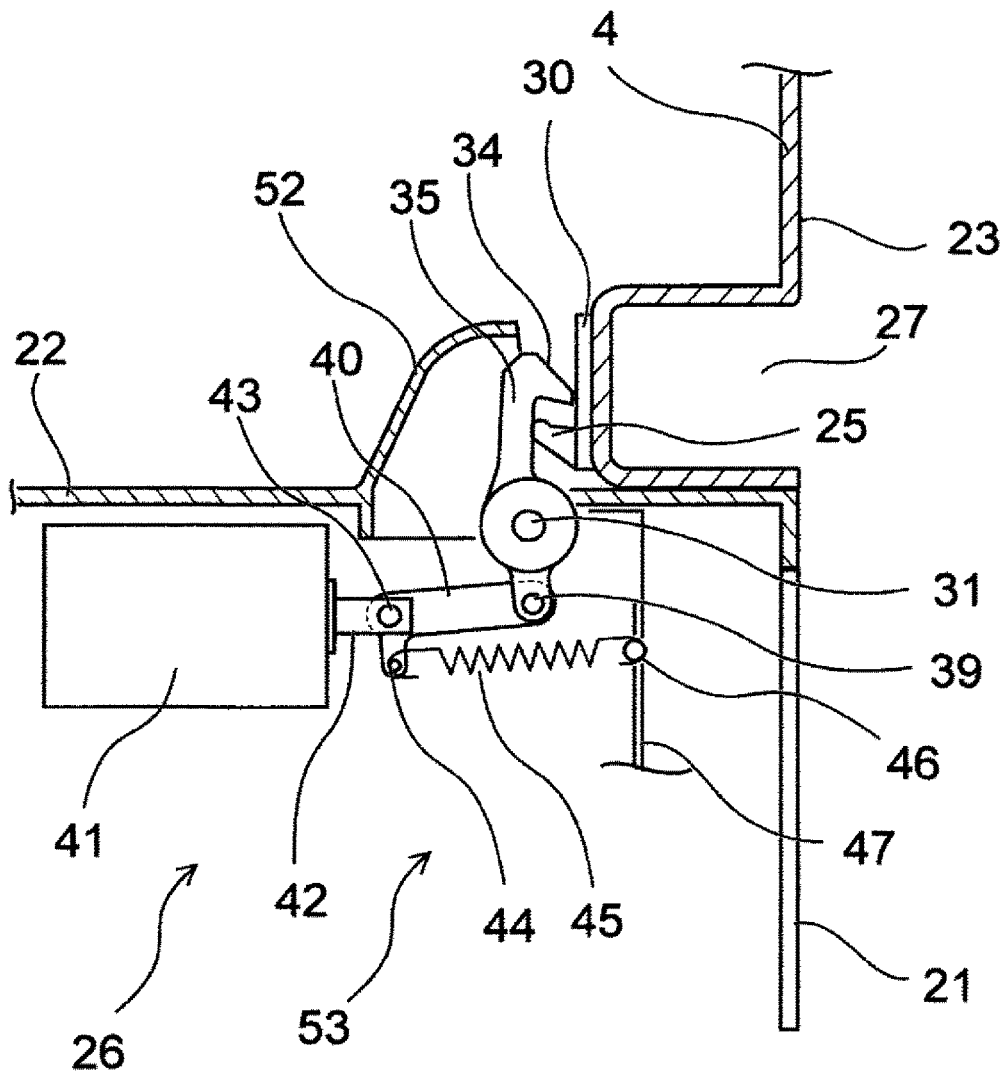
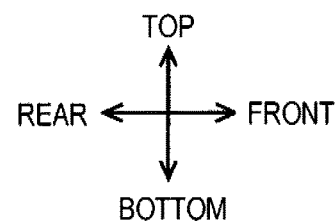

[FIG. 17]
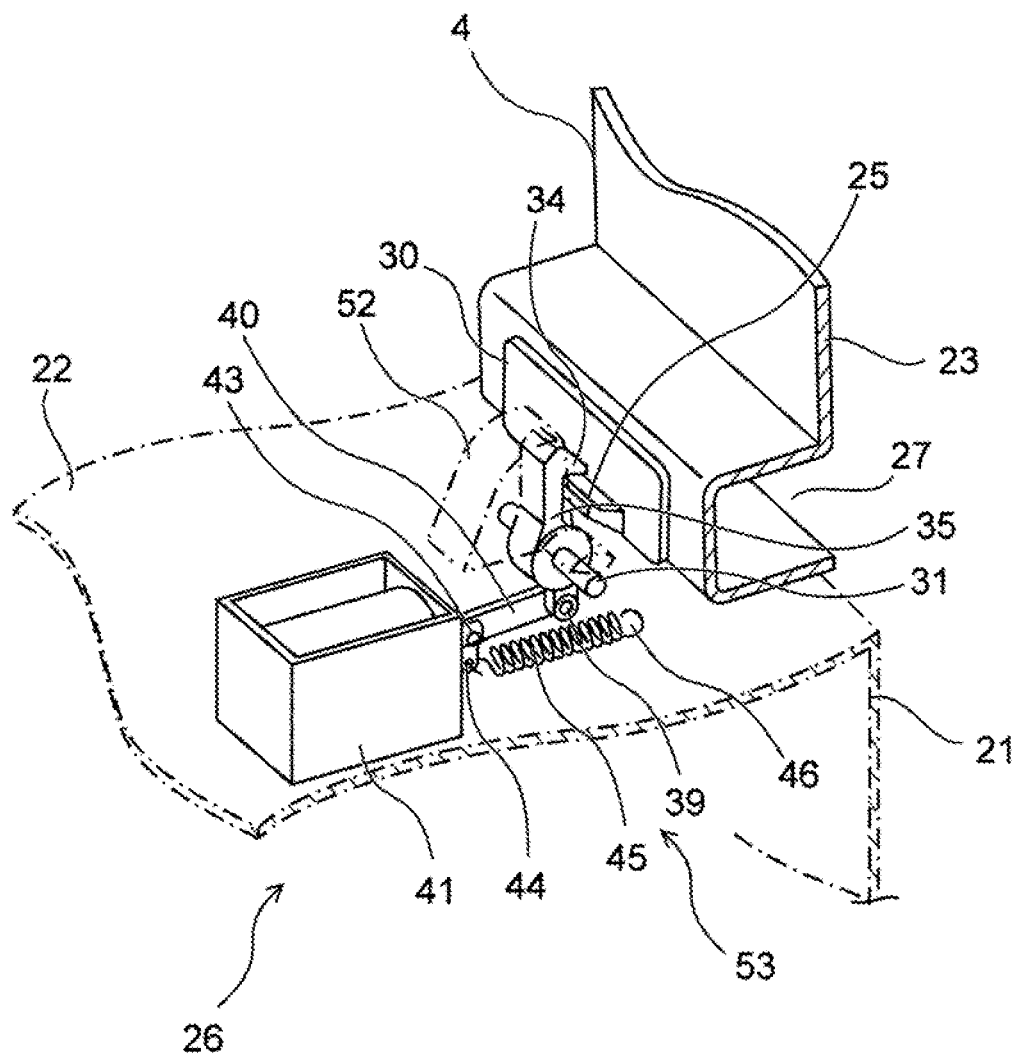
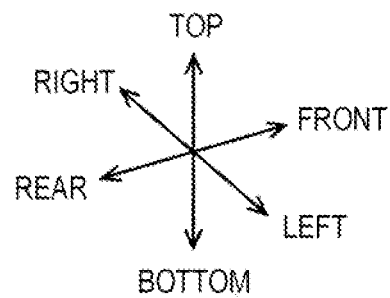

AUTOMATIC ANALYSIS DEVICE

TECHNICAL FIELD

The present invention relates to an automatic analysis device that carries out a qualitative or quantitative analysis of a biological sample such as blood or urine.

BACKGROUND ART

An automatic analysis device is configured to automatically analyze a biological sample such as blood or others and to output a result of the analysis, and is an essential device in hospitals and medical testing facilities. These automatic analysis devices are required to carry out more various types of testing in a shorter period of time.

The automatic analysis device has a work surface on which the analysis is carried out, and has a safety cover of opening/closing type in an area above the work surface. The safety cover includes an interlock mechanism for locking the safety cover, so that the safety cover is not open when the automatic analysis device is in operation. When an operator replaces consumables or others, the operator stops the device and unlocks the interlock mechanism, so that the safety cover is ready to be opened/closed. With the safety cover in an open state, the operator is allowed to access the work surface to carry out various types of work.

PTL 1 discloses an automatic analysis system (automatic analysis device) where "a sample processing apparatus includes a measurement unit 10 including a moving mechanism covered by a body cover C1. The measurement unit 10 also includes a lock mechanism configured to lock the body cover C1 to prevent the body cover C1 from being opened" (Solution). Further, "a support C12 is provided, inside the body cover C1, at a front portion of the left lateral side of the body cover C1." A flange C12a extending parallel to the Y-Z plane is formed at the right end of the support C12. A hole C12b passing through the flange C12a in the X-axis direction is formed near the lower end of the flange C12a" (Description [0054]). Additionally, "the lock mechanism C2 includes a shaft C21, an engaging plate C22, a spring C23, and a motor C24. The shaft C21 extends in the Y-axis direction and is arranged within the measurement apparatus 2. The engaging plate C22 is supported by the shaft C21 so as to be able to rotate, in the X-Z plane, about the shaft C21. An L-shaped engagement portion C22a is formed in an upper end portion of the engaging plate C22, and a flange C22b having a plane parallel to the Y-axis is formed near a lower end portion of the engaging plate C22. The lower end of the spring C23 is fixed within the measurement apparatus 2, and the upper end of the spring C23 is fixed to the engaging plate C22. The motor C24 includes a shaft C24a extending in the X-axis direction, and a pushing member C24b is provided at the left end of the shaft C24a" (Description [0055]).

CITATION LIST

Patent Literature

PTL 1: JP 2013-076678 A

SUMMARY OF INVENTION

Technical Problem

PTL 1 discloses a configuration where the support C12 as a lock receiving portion is provided "inside the body cover C1, at the front portion of the left lateral side of the body cover C1". With this configuration, the left lateral side of the body cover is locked; however, even when the body cover is in the locked state, with some force applied in an opening direction toward the right lateral side of the body cover, the body cover is deformed and deflected, causing a clearance between the apparatus and a lower end of the body cover.

Further, "the L-shaped engagement portion C22a formed in the upper end portion of the engaging plate C22" is a locking claw portion having a thinning shape toward its tip. When the body cover C1 is open, the L-shaped engagement portion C22a protrudes to be exposed upward from the lower end of the body cover C1. In this state, the lower end of the body cover C1, while corresponding to an upper surface of the apparatus (hereinafter, may be referred to as a work surface), is not flush with the upper surface (work surface) of the apparatus. Thus, during cleaning, the L-shaped engagement portion C22a may be caught by a cleaning tool and may be deformed.

The L-shaped engagement portion C22a is provided inside the body cover C1, and when the body cover C1 is in an unlocked state, the engagement portion C22a is positioned closer to inside the body cover C1; and when the body cover C1 is in the locked state, the engagement portion C22a moves away from inside the body cover C1 toward the flange C12a, so as to fit into the hole C12b that is provided at the flange C12a as a part of the support C12 as the lock receiving portion. Accordingly, a clearance is required between the body cover C1 and the flange C12a, and the clearance is required to have a sufficient dimension such that, while in the unlocked state, the L-shaped engagement portion C22a is inserted into or removed from the clearance. With this configuration, it is difficult to provide the flange C12a and the body cover C1 in proximity to each other. Additionally, the support C12 in the L shape and the flange C12a protrude inward of the body cover C1, and thus, it is difficult to provide the lock receiving portion formed in a smaller size and a smoother shape.

Further, a clearance is required in an area surrounding the engaging plate C22, causing foreign substances or liquid to drop in through the clearance onto the work surface, which is not described in PTL 1.

In opening the safety cover, in a case where the locking claw portion (engagement portion C22a) protrudes from the work surface, or in a case where the lock receiving portion (support C12) provided inside the safety cover largely protrudes from a center of front surface of the apparatus or the lock receiving portion has its end portion formed in a pointed shape, the operator has difficulty in carrying out work and tends to have the cleaning tool, e.g., a cloth or a brush, being caught by the locking claw portion or the lock receiving portion. Accordingly, each of the locking claw portion and the lock receiving portion is desirably required to have a small amount of protrusion and a smoother shape.

An object of the present invention is to provide an automatic analysis device that is highly reliable for securely closing the safety cover in the locked state.

Solution to Problem

In order to achieve the object, the present invention provides an automatic analysis device including:
  a housing that houses an analysis device;
  a work surface that is an upper surface of the housing;
  a cover that covers an upper side of the work surface and is axially supported to be rotatable about a support shaft between a closing position and an upwardly open opening position, the support shaft being provided on one side of the housing; and closing means for inhibiting the cover from being opened at the closing position.

In the automatic analysis device, the closing means includes:

a protrusion portion that protrudes rearward from a front surface of the cover;

a locking lever that is axially supported to be rotatable about a rotating support shaft and inhibits the cover from being opened by rotating in a direction from the work surface toward the protrusion portion to cause an engagement portion to engage with the protrusion portion; and driving means for driving the locking lever.

Advantageous Effects of Invention

The present invention effectively provides an automatic analysis device that is highly reliable for securely closing a safety cover in a locked state.

With the safety cover according to the present invention, a lock mechanism is disposed at a center portion of the front surface of the safety cover, so that when the lock mechanism acts to lock the safety cover, the center portion is engaged. With this configuration, even when some force is applied in an opening direction toward left and right sides of the safety cover, the body cover is less prone to be deformed and deflected, and thus, a clearance is unlikely to be formed between the automatic analysis device and the lower end of the body cover.

Here, lock receiving means 25 is configured to protrude from an inner side of a safety cover 4, and a locking lever 35 rotates toward the front surface of the safety cover 4 from a work surface 22, so as to engage with the lock receiving means 25 to lock the safety cover 4. With this configuration, the lock receiving means 25 protrudes in a smaller amount, facilitating a reduction in size; and the lock receiving means 25 is not formed in a hook or flange shape but in a smoother shape.

Further, the lock receiving portion is disposed in contact with a rear side of a handhold portion, so that when the safety cover 4 is in the locked state and the force is applied by an operator to the handhold portion in the opening direction, the closing means preferably and reliably inhibits the safety cover 4 from being opened.

When locking means 26 does not function, the locking lever 35 is designed to be flush with the work surface 22. Thus, when the safety cover 4 is open, a claw portion of the locking lever 35, having a hook or flange shape, does not protrude from the work surface 22, and thus does not hinder cleaning of the work surface 22 with a cleaning tool such as a cloth or a brush.

Further, the work surface 22 includes a recessed portion to accommodate the locking lever 35, and the recessed portion has a one-end shape to prevent foreign substances or liquid from dropping in through the clearance. With this configuration, the automatic analysis device is provided in a simpler structure and a smaller size.

BRIEF DESCRIPTION OF DRAWINGS

FIG. 1 is a diagram illustrating a configuration of an automatic analyzer according to a first embodiment of the present invention.

FIG. 2 is a perspective view illustrating the automatic analyzer according to the first embodiment of the present invention.

FIG. 3 is a left side view illustrating the automatic analyzer according to the first embodiment of the present invention.

FIG. 4A shows a top view illustrating safety cover locking means in the automatic analysis device according to the first embodiment of the present invention.

FIG. 4B shows an A-A cross-sectional view illustrating the safety cover locking means in the automatic analysis device according to the first embodiment of the present invention.

FIG. 5 is a perspective view illustrating an unlocked state of the safety cover locking means in the automatic analyzer according to the first embodiment of the present invention.

FIG. 6 is a perspective view illustrating a structure of the safety cover locking means in the unlocked state of the safety cover locking means in the automatic analyzer according to the first embodiment of the present invention.

FIG. 7 is an A-A cross-sectional view illustrating a locked state of the safety cover locking means in the automatic analyzer according to the first embodiment of the present invention.

FIG. 8 is a B-B cross-sectional view illustrating the locked state of the safety cover locking means in the automatic analyzer according to the first embodiment of the present invention.

FIG. 9 is a perspective view illustrating the locked state of the safety cover locking means in the automatic analyzer according to the first embodiment of the present invention.

FIG. 10 is an A-A cross-sectional view illustrating the locked state of the safety cover locking means in the automatic analyzer according to the first embodiment of the present invention and is a partially enlarged view illustrating the vicinity of a locking lever portion.

FIG. 11 is an A-A cross-sectional view illustrating the locked state of the safety cover locking means in the automatic analyzer according to the first embodiment of the present invention and is a partially enlarged view illustrating the vicinity of the locking lever portion.

FIG. 12A shows a rear view illustrating the safety cover locking means in the automatic analysis device according to the first embodiment of the present invention, and illustrates a reaction force during locking in a case where the safety cover locking means is in an L shape.

FIG. 12B shows a rear view illustrating the safety cover locking means in the automatic analysis device according to the first embodiment of the present invention, and illustrates a reaction force during the locking in a case where the safety cover locking means is in a T shape.

FIG. 13 is an A-A cross-sectional view illustrating the locked state of the safety cover locking means in the automatic analyzer according to the first embodiment of the present invention and is a partially enlarged view illustrating the vicinity of the locking lever portion.

FIG. 14 is an A-A cross-sectional view illustrating an unlocked state of a safety cover locking means in an automatic analyzer according to a second embodiment of the present invention.

FIG. 15 is a perspective view illustrating a structure of the safety cover locking means in the unlocked state of the safety cover locking means in the automatic analyzer according to the second embodiment of the present invention.

FIG. 16 is an A-A cross-sectional view illustrating a locked state of the safety cover locking means in the automatic analyzer according to the second embodiment of the present invention.

FIG. 17 is a perspective view illustrating a structure of the safety cover locking means in the locked state of the safety cover locking means in the automatic analyzer according to the second embodiment of the present invention.

DESCRIPTION OF EMBODIMENTS

Embodiments of the present invention will be described below with reference to the drawings.

Each of FIGS. 1 to 12A and 12B relates to a first embodiment of the present invention. FIG. 1 is a plan view illustrating an automatic analysis device including a reagent disk (hereinafter, may be referred to as a reagent container holder). FIG. 2 is a perspective view illustrating the automatic analysis device. FIG. 3 is a left side view illustrating the automatic analysis device.

Additionally, in descriptions below, a direction of top to bottom, a direction of left to right, and a direction of front to rear are based on directions of top to bottom, left to right, and front to rear indicated in FIG. 1 and FIG. 2.

Each of FIGS. 1 to 3 illustrates a basic configuration of an automatic analysis device 1 according to this embodiment.

The automatic analysis device has an outer shape of a housing 21 formed in substantially a rectangular parallelepiped shape. The housing 21 covers a substrate or various flow paths. The housing has an upper surface 22 (hereinafter, may be referred to as a work surface), and various mechanisms required for an analysis of a sample (hereinafter, may be referred to as various operation mechanism group) are disposed on the upper surface 22. The mechanisms include a reagent refrigerator (hereinafter, may be referred to as a reagent container or a reagent drum), a reagent dispensing probe, a sample transport mechanism, a sample dispensing probe, an incubator, a detecting unit, various probe cleaning mechanisms, and others. Each of the mechanisms will be described in detail later.

The reagent refrigerator has a cylindrical shape and houses a reagent disk 2 that is rotatably supported about a vertical shaft. The reagent disk holds a plurality of reagent containers (hereinafter, may be referred to as a reagent container, a reagent bottle, or simply as a bottle) on a circumference along an inner side of its outer peripheral wall.

The reagent dispensing probe uses a dispensing pipette to suck a reagent predetermined in a predetermined amount from each of reagent bottles 3, and dispenses the reagent sucked to a reaction container. The sample dispensing probe collects and supplies a sample as a biological sample, e.g., blood or urine, to the reaction container. The sample has been transported by sample transport means as will be described later.

When the reaction container has contained reaction solution in which the reagent and the sample are mixed, the reaction container is controlled at a predetermined temperature of the incubator where reaction in the reaction solution is promoted for a predetermined period of time. When the reaction solution has completed the reaction, the detecting unit detects physical characteristics of the reaction solution as will be described later. The physical characteristics include an amount of emitted light, an amount of scattered light, an amount of transmitted light, a current value, a voltage value, and the like; however, the present invention is not limited thereto, and may employ a measurement unit for measuring known physical characteristics.

The automatic analysis device 1 includes a safety cover 4 for covering a moving part. The safety cover 4 is supported by a hinge to be open and closed, for example, rearward. The safety cover 4 includes an interlock typically driven by, for example, a solenoid. When the automatic analysis device 1 is in operation, the solenoid is powered on to lock and hold the safety cover 4 in a closed state. When the automatic analysis device 1 is out of operation, the solenoid is powered off to put the safety cover 4 ready to be opened, enabling an operator to replace each of the reagent bottles 3.

The safety cover 4 includes a safety cover front side 24 as a lower side of a front surface 23, and the interlock includes lock receiving means 25 and locking means (closing means) 26. The lock receiving means 25 is a protrusion portion that is provided at a substantially right-left center of the safety cover front side 24 and protrudes rearward from the front surface 23, in other words, protrudes inward of the automatic analysis device. The locking means (closing means) 26 is provided on a work surface 22, at a position opposite the lock receiving means 25 when the safety cover 4 is in the closed state, so as to correspond to the lock receiving means 25. A structure of the interlock will be described in detail later.

A transport path of the sample transported for analysis will be described. Sample transport means 5, e.g., a belt conveyer or a rack handler, transports a sample 5a for analysis in the automatic analysis device 1 to dispense the sample 5a to sample dispensing means 6. The sample dispensing means 6 includes the dispensing pipette for dispensing the sample.

The plurality of reaction containers and a plurality of sample dispensing chips are mounted on sample dispensing chip/reaction container supply means 7 (hereinafter, may be referred to as a chip rack) while being supplied in the automatic analysis device 1.

The reaction containers are respectively gripped from the chip rack 7 and raised to be moved to an incubator 9 (may be referred to as a culture disk) by sample dispensing chip/reaction container transport means 8. Sample dispensing chips 10 are respectively gripped from the chip rack 7 and then raised to be moved to sample dispensing chip buffer 11 by the sample dispensing chip/reaction container transport means 8.

In order to move these items, the sample dispensing chip/reaction container transport means 8 is configured to be movable in an X-axis direction (direction of left to right), a Y-axis direction (direction of front to rear), and a Z-axis direction (direction of top to bottom). The sample dispensing chip/reaction container transport means 8 is also configured to be movable within a range between a reaction container waste hole 12, the sample dispensing chip buffer 11, reaction solution stirring means 13, the chip rack 7, and a partially upward part of the incubator 9.

The sample dispensing chip buffer 11 has the plurality of sample dispensing chips 10 temporarily mounted thereon. The sample dispensing means 6 moves to an area above the sample dispensing chip buffer 11 to grip any one of the sample dispensing chips 10.

The incubator 9 of a disk shape is axially supported to be rotatable about a vertical central shaft and has a plurality of reaction containers 14 engaged on a circumference in a vicinity of an outer periphery of the incubator 9. With this configuration, the incubator 9 rotates to move each of the reaction containers 14 to a predetermined position.

The sample dispensing means 6 moves to a region above the sample to suck the sample into the sample dispensing chip 10. Then, the sample dispensing means 6 moves to a region above each of the reaction containers 14 on the incubator 9 to discharge the sample from the sample dispensing chip 10 to the corresponding reaction container 14. Subsequently, the sample dispensing means 6 moves to a region above a sample dispensing chip/reaction container waste hole 12 to drop the sample dispensing chip 10 in the hole for disposal.

Next, a transport path of the reagent to be added to the sample in the reaction container 14 will be described.

The reagent refrigerator of the cylindrical shape has an inner hollow where the reagent disk 2 is accommodated and is axially supported to be rotatable about the vertical shaft as a central shaft. The reagent disk 2 includes a plurality of radial slots, each of which holds one of the plurality of reagent bottles 3, along the inner hollow side of the outer peripheral wall. The reagent disk 2 rotates to move each of the reagent bottles 3 to a predetermined position on the circumference of the reagent disk 2. Note that, some of the reagent bottles 3 contain a reagent containing a large number of magnetic particles for stirring. In order to control the reagent bottles 3 at a constant temperature, the reagent refrigerator has a heat insulating function.

The reagent refrigerator has a lid for covering an upper portion of the reagent refrigerator, and the lid has a reagent bottle loading port 20. The reagent bottle loading port 20 is configured to place each of the reagent bottles 3 to the reagent disk 2 and remove the corresponding reagent bottle 3 from the reagent disk 2. The reagent bottle loading port 20 includes a reagent bottle loading port lid (not illustrated) for opening/closing the reagent bottle loading port 20, and further includes an interlock (not illustrated) using a solenoid or others. Similarly to the safety cover 4, the reagent bottle loading port lid is configured to be in a locked state when the automatic analysis device 1 is in operation; and the reagent bottle loading port lid is configured to be in an unlocked state to be opened when the automatic analysis device 1 is out of operation.

A reagent dispensing pipette 15 is configured to be movable to suck the reagent from each of the reagent bottles 3 and move the reagent sucked to the predetermined position. First, the reagent dispensing pipette 15 moves to a region above the reagent of a predetermined type on the reagent disk 2 to suck the reagent in the predetermined amount. Then, the reagent dispensing pipette 15 moves to the region above the reaction container 14 predetermined on the incubator 9 to discharge the reagent sucked to the reaction container 14.

The reagent refrigerator includes, at its upper portion, stirring means 16 for stirring the reagent. The stirring means 16 is provided with a magnetic-particle stirring arm (may be referred to as a stirrer) that is rotatable about the vertical shaft. The magnetic-particle stirring arm moves to the region above the reagent bottle 3 that contains a reagent containing magnetic particles to be stirred. Then, the magnetic-particle stirring arm lowers magnetic-particle stirring means into the reagent. The magnetic-particle stirring means, having, for example, a paddle shape or a spiral shape, is provided at a lower end of the magnetic-particle stirring arm and is rotated to stir a solution of the magnetic particles. In order to prevent spontaneous sedimentation of the magnetic particles in the solution, the magnetic-particle stirring arm stirs the magnetic particles immediately before the reagent is dispensed. Having stirred the magnetic particles, the magnetic-particle stirring arm rises to the area above the reagent bottle 3 and moves to a region above cleaning means 17 containing a cleaning solution. The magnetic-particle stirring arm lowers into the cleaning solution to rotate the magnetic-particle stirring means, so as to remove the magnetic particles attached to the magnetic-particle stirring means.

In the predetermined period of time elapsed from each of the sample and the reagent predetermined is dispensed, a reaction solution is formed. The reaction solution is sucked from the reaction container 14 and supplied to detecting means 19 by a reaction solution aspiration nozzle 18. The detecting means 19 analyzes the reaction solution. Any known method may be applied to analyze the reaction solution. Further, the reaction solution may be analyzed while being held in the reaction container 14.

Then, the sample dispensing chip/reaction container transport means 8 moves the reaction solution analyzed to the region above the sample dispensing chip/reaction container waste hole 12, and disposes the sample dispensing chip 10 in the sample dispensing chip/reaction container waste hole 12. Note that, in some types of measurement, the reaction container may be reused multiple times. In that case, after the reaction solution in the reaction container that has been analyzed is disposed of, the reaction container is cleaned with washing water.

These series of operations in the device is controlled by a host computer 100 as control means.

The automatic analysis device combines or repeats the operations above, so as to efficiently analyze a plurality of samples regarding a plurality of analysis items.

First Embodiment

FIG. 3 is the left side view illustrating the automatic analysis device according to the first embodiment of the present invention. In FIG. 3, the safety cover 4 in the closed state is illustrated with a solid line, and the safety cover 4 in the open state is illustrated with a single chain line. At the front side of the safety cover 4, a handhold portion 27 is provided. The handhold portion 27 is a recessed portion into which a finger is inserted to open the safety cover 4 from a closed position. In this embodiment, the lock receiving means 25 is provided in contact with and extending rearward from a rear surface of the handhold portion 27.

The safety cover 4 is axially supported to be rotatable about a cover support point 28, which is provided along a vicinity of a rear side of the housing 21, between a fully open position and the closed position. When the safety cover 4 is open to abut a stopper (not illustrated) and is supported by support means (not illustrated) not to be closed by a weight of the safety cover 4, the front side of the safety cover 4 rises to a height H1. This configuration allows the operator to insert his/her arm or upper-half body through a clearance between the work surface 22 and the front side of the safety cover 4, and thus allows the operator to clean or replace the various operation mechanism group 29 on the work surface 22, clean the work surface 22, or replace the reagent bottles 3. Accordingly, the safety cover 4 desirably has the height H1 (to which the front side rises) sufficiently high, and the safety cover 4 desirably has no partial protrusion downward from the front side. Alternatively, when the safety cover 4 has the protrusion, the protrusion desirably has a smooth outer shape.

FIG. 4A shows a top view and FIG. 4B shows an A-A cross-sectional view, each illustrating an unlocked state of safety cover locking means in the automatic analysis device according to the first embodiment of the present invention.

FIG. 5 is a perspective view illustrating the unlocked state of the safety cover locking means in the automatic analysis device according to the first embodiment of the present invention. FIG. 6 is a perspective view illustrating a structure of the safety cover locking means in the unlocked state of the safety cover locking means in the automatic analysis device according to the first embodiment of the present invention.

FIG. 7 is an A-A cross-sectional view, FIG. 8 is a B-B cross-sectional view, and FIG. 9 is a perspective view, each illustrating a locked state of the safety cover locking means in the automatic analysis device according to the first embodiment of the present invention.

Each of FIG. 10 and FIG. 11 is an A-A cross-sectional view illustrating the locked state of the safety cover locking means in the automatic analysis device according to the first embodiment of the present invention and is a partially enlarged view illustrating a vicinity of a locking claw portion.

Each of FIG. 12A and FIG. 12B shows a rear view illustrating the safety cover locking means in the automatic analysis device according to the first embodiment of the present invention. FIG. 12A illustrates a reaction force during locking in a case where the safety cover locking means is in an L shape, and FIG. 12B illustrates a reaction force during the locking in a case where the safety cover locking means is in a T shape.

At the front side of the safety cover 4, the handhold portion 27 is provided along the lower end as the recessed portion into which a finger is to be inserted. At rear surface of the handhold portion 27, the lock receiving means 25 is provided in pairs at left and right sides. The pair of lock receiving means 25 protrude rearward from a lock receiving base 30 that is formed in a plate shape and provided between the rear surface of the handhold portion 27 and the pair of lock receiving means 25. Each of the pair of lock receiving means 25 has a downward surface as an inclined surface that is formed in a tapered shape toward the tip in side view. Additionally, the pair of lock receiving means 25 have a left end and a right end, each formed as an inclined surface having a tapered shape towards the tip in plan view. Accordingly, the lock receiving means 25 has a smooth shape such that its side surface ridgeline forms a smooth angle. The lock receiving means 25 has an upper surface as an inclined surface that is increased in height as away from the front surface of the safety cover 4. The upper surface of the lock receiving means 25 forms an acute angle less than 90° with respect to a vertical plane as an angle θ1.

A first support shaft 31 is provided parallel to a safety cover front surface 23, and a first gear 32 is axially supported to be rotatable about the first support shaft 31. The first gear 32 is provided within a range of substantially 90° about the first support shaft 31. The first gear 32 is integrally formed with a support rod portion 33 that extends rearward. At a tip end of the support rod portion 33, a pair of locking portions 34 are provided parallel to the first support shaft 31 (that is positioned beyond the support rod portion 33), and protrude in the direction of left to right. The pair of locking portions 34 and the support rod portion 33 form a locking lever 35 in substantially the T shape. In side view in the direction of left to right, the locking portion 34 has a planar upper surface with a tapered shape downward; and at lower side, the locking portion 34 has a sectional surface with a smooth, substantially semi-cylindrical shape. In top view, each of the pair of locking portions 34 has a semicircular shape at its tip end and has its lower half in a smooth, hemispherical shape. The support rod portion 33 and the pair of locking portions 34 are smoothly combined with an R-shaped joint therebetween, and thus less prone to broken by stress concentration.

Amounts of the pair of locking portions 34 protruding with respect to the support rod portion 33, i.e., the amounts of protruding leftward and rightward, are not required to be equal to each other. Thus, the pair of locking portions 34 have an asymmetric shape, having one longer than the other. Alternatively, the locking portion 34 may be formed in substantially the L-shape in plan view, extending only at one side with respect to the support rod portion 33.

The first gear 32 has a cylindrical portion 48 that has no tooth from a gear tooth tip at bottom face side to the support rod portion 33, as with a tooth tip circle of the first gear 32.

The locking lever 35 is disposed to face in the direction of front to rear to be parallel to the work surface 22, when being unlocked. The work surface 22 has a recessed portion provided to accommodate the locking lever 35, when being unlocked. The locking lever 35 has an upper surface designed to be planar and flush with the work surface 22. The work surface 22 may further include a pair of left and right cover portions 36 as a mild protrusion, having the locking lever 35 between the work surface 22 and the pair of cover portions 36. The pair of cover portions 36 are formed in a partial columnar shape and provided to cover the first support shaft 31.

With the locking lever 35 in the unlocked state, a part of the upper surface of the locking lever 35 covered with the pair of left and right cover portions 36 may have a similar partial columnar shape to the pair of left and right cover portions 36, so that the locking lever 35 and the pair of left and right cover portions 36 are formed smoothly and continuously. In this state, the work surface 22 has no step or protrusion, thereby preventing a cleaning tool, e.g., a cloth or a brush, from being caught when a user cleans the work surface 22.

With regard to an inner distance between the pair of lock receiving means 25 in the direction of left to right, the inner distance is larger than a left-to-right width of the support rod portion 33. With this configuration, the support rod portion 33 fits between the pair of lock receiving means 25.

The locking means 26 is provided in pairs at left and right sides, and has an entire left-to-right width larger than a left-to-right width between the tips of the pair of lock receiving means 25. With this configuration, the locking means 26 at left side engages with the lock receiving means 25 at left side, and the locking means 26 at right side engages with the lock receiving means 25 at right side.

A second support shaft 37 is provided parallel to the first support shaft 31, and a second gear 38 is axially supported to be rotatable about the second support shaft 37. The second gear 38 is configured to engage with the first gear 32 to rotate. The second gear 38 has teeth, the number of which is arranged such that the first gear 32 rotates 90° or more to rise.

The second gear 38 has a connecting shaft 39 provided parallel to the second support shaft 37, and a connecting plate 40 has one end axially supported to be rotatable about the connecting shaft 39. The connecting plate 40 has the other end axially supported to be rotatable about a driving pin 43. The driving pin 43 is provided at an end of a plunger of a solenoid 41. The solenoid 41 serves as an electromagnetic actuator, and the plunger 42 has a cylindrical shape. The plunger 42 is movably supported with respect to the solenoid 41 in a longitudinal direction. When the solenoid 41 is powered on by a power supply (not illustrated), the plunger 42 is drawn toward the solenoid 41, and when the solenoid 41 is powered off, the plunger 42 is released from the drawing force.

The connecting plate 40 has an end provided with a first spring peg portion 44, and a pull spring 45 has one end hooked on the first spring peg portion 44. The pull spring 45 has the other end hooked on a second spring peg portion 46 that is provided in a frame 47 fixed to the housing 21. The pull spring 45 has a spring force to pull the plunger 42 from the solenoid 41, and when the solenoid 41 is powered off, the pull spring 45 acts as a return spring.

The solenoid 41, the plunger 42, the connecting plate 40, the first gear 32, the second gear 38, and the pull spring 45 form driving means 53 for driving the locking lever 35.

The locking lever 35 and the driving means 53 are covered with the frame 47 as a molded product made of, for example, a resin. The frame 47 may include a connector 54 as a single unit, the connector for externally connecting a wiring of the solenoid 41. Alternatively, the frame 47 may be attached to a lower side of the work surface 22.

In FIGS. 4A, 4B, 5, and 6, the solenoid 41 has been powered off, and the plunger 42 is thus pulled out at maximum from the solenoid 41 by the spring force of the pull spring 45. On the drawings of FIGS. 4A and 4B, the second gear 38 rotates clockwise via the connecting plate 40 and the connecting shaft 39, and the first gear 32 rotates counterclockwise. As a result, each of the support rod portion 33 and the pair of locking portions 34 is accommodated in a recessed portion 49 provided on the work surface 22, causing the upper surface to be flush with the work surface 22. The recessed portion 49 is T-shaped in top view such that the locking lever 35 having the T shape is accommodated therein. The recessed portion 49 is formed one size larger than the locking lever 35, having an approximately 1 mm clearance from a peripheral outer shape of the locking lever 35, so that the recessed portion 49 does not interfere with the outer periphery of the locking lever 35.

In other words, in this state, the locking portion 34 does not act on the lock receiving means 25 provided on the safety cover 4. Thus, the safety cover 4 is in the unlocked state and ready to be opened/closed by the user.

In FIGS. 7 to 9, the safety cover 4 is in the locked state. When the safety cover 4 is in the closed state and the solenoid 41 is powered on, the plunger 42 is drawn by a force exceeding the spring force of the pull spring 45 to move the connecting plate 40 and the connecting shaft 39 toward the solenoid 41 via the driving pin 43 and to rotate the second gear 38 counterclockwise on the drawing of FIG. 7. The first gear 32, engaging with the second gear 38, rotates clockwise, causing the support rod portion 33 and the locking portion 34 to rise from the work surface 22. The support rod portion 33 and the locking portion 34 continue to rise until abutting the lock receiving base 30 above the pair of lock receiving means 25 provided at rear side of the handhold portion 27 of the safety cover 4, and then stop. In this state, when the user puts his/her finger into the handhold portion 27 to lift the front surface of the safety cover 4 to open the safety cover 4, the lock receiving means 25 rises along with the front surface of the safety cover 4, and each of the pair of lock receiving means 25 at left and right sides has the upper surface abutting a bottom surface of a corresponding one of the pair of locking portions 34 at left and right sides. This configuration inhibits the safety cover 4 from being opened. In other words, the safety cover 4 is in the locked state and is not opened.

In other words, provided is an automatic analysis device including:

a housing that houses an analysis device;
a work surface that is an upper surface of the housing;
a cover that covers an upper side of the work surface and is axially supported to be rotatable about a support shaft between a closing position and an upwardly open opening position, the support shaft being provided on one side of the housing; and
closing means for inhibiting the cover from being opened at the closing position.

In the automatic analysis device, the closing means includes:

a protrusion portion (the lock receiving means 25) that protrudes rearward from a front surface of the cover;
the locking lever 35 that is axially supported to be rotatable about a rotating support shaft and inhibits the safety cover 4 from being opened by rotating in a direction from the work surface toward the protrusion portion to engage with the protrusion portion; and
driving means for driving the locking lever 35.

With this configuration, the automatic analysis device is highly reliable for securely closing the safety cover 4 in the locked state.

The recessed portion 49, which is formed in the T shape and provided on the work surface 22, has a one-end shape with a bottom surface 50 to prevent foreign substances or liquid from dropping into the housing 21.

Each of the locking lever 35 and the lock receiving means 25 may be a molded component made of resin, thereby resulting at reasonable cost as well as smoother end surfaces and a more flexible shape than those of components made of metal, particularly a sheet metal. Accordingly, each of the locking lever 35 and the lock receiving means 25 has a reduced amount of protrusion from the safety cover 4, while maintaining a preferably reliable locking condition.

Next, each of the locking portion 34 and the lock receiving means 25 will be described in detail regarding the shape, with reference to FIGS. 10 and 11.

Each of FIG. 10 and FIG. 11 is the A-A cross-sectional view illustrating the locked state of the locking means 26 of the safety cover 4 and is the partially enlarged view illustrating a vicinity of the locking lever portion.

In FIG. 10, the lock receiving means 25 has the upper surface as the inclined surface that is increased in height as away from the front surface of the safety cover 4. The upper surface of the lock receiving means 25 forms the acute angle less than 90° with respect to the vertical plane as the angle θ1. The locking portion 34 as a part of the locking lever 35 has a surface closer to the support rod portion 33, and with the locking lever 35 in a state of standing upright, the surface also forms an acute angle less than 90° with respect to the vertical plane, the acute angle substantially equal to the angle θ1.

In other words, the bottom surface of the locking portion 34 and the upper surface of the lock receiving means 25 abut each other and respectively form the acute angle. With this configuration, when the user tries to open the safety cover 4 in the locked state, the reaction force is generated to draw the locking portion 34 and the lock receiving means 25 toward each other. As a result, the locking portion 34 engages with the lock receiving means 25 more firmly, and the safety cover 4 is securely maintained in the locked state.

In FIG. 11, the lock receiving means 25 includes a protrusion portion 51 at its rear end portion that is farthest away from the front surface of the safety cover 4, and the protrusion portion 51 smoothly protrudes upward. FIG. 11 illustrates a case where, due to a reduction in voltage applied to the solenoid 41 or the like, the locking lever 35 has rotated not to stand upright as illustrated in FIG. 10 but to form an angle θ2 less than the right angle. In such a case, the protrusion portion 51 abuts the semi-cylindrical portion at rear surface side of the locking portion 34, and the reaction force generated when trying to open the safety cover 4 acts in a direction perpendicular to the contact surface, by a radius R from the first support shaft 31. This configuration generates a moment on the locking lever 35 toward the lock receiving base 30. Accordingly, the locking lever 35 does not come off but is maintained at the locked state.

In this embodiment, the locking lever 35 has two types: one is formed in substantially the L shape where the locking portion 34 extends from the support rod portion 33 to one side; and the other is in substantially the T shape where the pair of locking portions 34 extend from the support rod portion 33 to both sides. Each of the substantial L shape and the substantial T shape has its own action and effect as will be described with reference to FIG. 12A and FIG. 12B.

In FIG. 12A, the locking lever 35 has the substantial L shape where the locking portion 34 extends from the support rod portion 33 leftward only. Here, the locking lever 35 is subjected to a reaction force F caused by trying to open the safety cover 4. The reaction force F is only applied to the locking portion 34 extending leftward, and thus, a bending moment M is generated to bend the locking lever 35 rightward. In this state, the locking lever 35 is deflected rightward and is prone to move rightward, and the locking portion 34 is prone to come off from the lock receiving means 25 with which the locking portion 34 engages. Further, in addition to a tensile stress caused by the reaction force F, a bending stress caused by the bending moment M is generated with the support rod portion 33. As a result, the locking lever 35 is subjected to a maximum stress.

In FIG. 12B, the locking lever 35 according to this embodiment has the substantial T shape. The locking lever 35 is subjected to the reaction force F caused by trying to open the safety cover 4.

The reaction force F is evenly applied as a reaction force (F/2) to the pair of locking portions 34 at left and right sides. The reaction force (F/2) is symmetrically applied to the support rod portion 33, so that no force to move leftward or rightward is generated. In this state, the locking lever 35 stably functions. Even in a case where the reaction force (F/2) acts toward a position deviated from the symmetrical position between left and right, the moment generated with the support rod portion 33 is only a product of an amount of deviation from the symmetrical position and the reaction force. Thus, the bending moment is small, and only approximately the tensile force acts on the locking lever 35.

With the locking lever 35 in substantially the T shape, the support rod portion 33 is subjected largely to the tensile force caused by the reaction force F, and hardly to the bending moment. Accordingly, even in a case where the reaction force F applied to the locking lever 35 is identical to that in the case of the substantial L shape (FIG. 12A), the stress generated with the locking lever 35 is less than in the case of the substantial L shape (FIG. 12A). With this configuration, the present invention provides an automatic analysis device with higher reliability.

FIG. 13 is an A-A cross-sectional view illustrating the locked state of the safety cover locking means and is a partially enlarged view illustrating the vicinity of the locking lever portion. Here, as a result of forward force applied by the operator to the handhold portion 27 of the safety cover 4, the safety cover 4 is in a deflected state and has moved forward. Along with the safety cover 4, the lock receiving means 25 has moved forward. In this state, the locking portion 34 preferably further rotates by only an angle of θ3 to move forward from the locking lever 35 in the state of standing upright. Then, even when the safety cover 4 is in the deflected state, the locking portion 34 reliably engages with the lock receiving means 25. With this configuration, in a state where the plunger 42 is drawn at maximum toward the solenoid 41, the locking lever 35 in the state of standing upright may further rotate by only the angle of θ3, by appropriately selecting an operation amount of the plunger 42, the number of teeth of the first gear 32, and the number of teeth of the second gear 38.

Second Embodiment

Next, a second embodiment of the present invention will be described with reference to FIGS. 14 to 17. In descriptions below, with regard to the parts provided with the same configurations as in the first embodiment, a detailed description thereof will be omitted.

Unlike the first embodiment, with an automatic analysis device according to the second embodiment, a locking lever cover portion 52, which protrudes upward from a work surface 22 and is open at front, is included; a locking lever 35 is not T-shaped but has a locking portion 34 formed in a hook shape at an upper end of the locking lever 35; while in an unlocked state, the locking lever 35 does not have an upper surface flush with the work surface 22; and while in a locked state, the locking lever 35 is at a waiting position inside the locking lever cover portion 52.

Lock receiving means 25 is not provided in pairs at left and right sides, but is provided at one position opposite the locking lever 35.

A connecting shaft 39 is integrally formed with the locking lever 35, and when a plunger 42 is drawn toward a solenoid 41, the locking portion 34, having the hook shape and provided at a tip of the locking lever 35, is drawn via a connecting plate 40 and the connecting shaft 39 to rotate forward, so as to engage with the lock receiving means 25. The lock receiving means 25 is not provided in pairs, but is provided at one position corresponding to the locking lever 35.

FIG. 14 is an A-A cross-sectional view and FIG. 15 is a perspective view, each illustrating the unlocked state of safety cover locking means according to the second embodiment. Here, the plunger 42 of the solenoid 41 is moved away from the solenoid 41 by a pull spring 45; the locking lever 35 rotates about a first support shaft 31 counterclockwise on the drawings of FIGS. 14 and 15; and the locking portion 34, having the hook shape and provided at the upper end of the locking lever 35, is separated from the lock receiving means 25 and does not engage with the lock receiving means 25. In this state, the safety cover 4 is in the unlocked state and ready to be opened/closed by the operator.

FIG. 16 is an A-A cross-sectional view and FIG. 17 is a perspective view, each illustrating the locked state of the safety cover locking means according to the second embodiment. Here, the solenoid 41 is powered on, and the plunger 42 is drawn toward the solenoid 41 by a force exceeding a pull force by the pull spring 45. This configuration draws the connecting shaft 39 via the connecting plate 40 toward the solenoid 41, causing the locking lever 35 to rotate about the first support shaft 31 clockwise on the drawings of FIGS. 16 and 17, and causing the locking portion 34 to move to above the lock receiving means 25. Similarly to FIG. 7 in the first embodiment, the safety cover locking means is in the locked state here.

In the second embodiment, while in the unlocked state, the locking lever 35 is not flush with the work surface but accommodated in the locking lever cover portion 52. When the locking lever 35 rotates from the unlocked state until the locked state, the rotational angle is less than in the first embodiment. Accordingly, the first gear 32 and the second gear 38 provided in the first embodiment are not required in the second embodiment, thereby resulting in the smaller number of components and a more simplified configuration.

Similarly to the first embodiment, the automatic analysis device according to the second embodiment has the configuration where: the locking portion 34 and the lock receiving means 25 form the engagement portion in the acute angle as illustrated in FIG. 10; the lock receiving means 25 includes the protrusion portion 51 as illustrated in FIG. 11; and the locking portion 34 further rotates by only the angle of θ3 as illustrated in FIG. 13. Accordingly, similarly to the first embodiment, the locking portion 34 further reliably engages with the lock receiving means 25.

In this embodiment, the solenoid 41 serves as a driving source provided in driving means 53 but the present invention is not limited thereto. The driving source may be a motor such as a stepping motor, a direct current motor, or an alternating current motor. Alternatively, speed reduction means, such as a worm gear, may be further included between the motor and the locking lever.

Effect

In the present invention, the locking lever 35 is disposed to face in the direction of front to rear to be parallel to the work surface 22, while in the unlocked state. The work surface 22 has the recessed portion provided to accommodate the locking lever 35, while in the unlocked state. The locking lever 35 is smoothly shaped and has the upper surface designed to be planar so as to be flush with the work surface 22. With this configuration, when the safety cover 4 is open in the unlocked state, the work surface 22 has no protrusion, allowing the operator to open the safety cover 4 to clean or replace the various operation mechanism group 29, clean the work surface 22, or replace the reagent bottle 3 without any difficulty. Additionally, while cleaning the work surface 22, a cleaning tool, e.g., a cloth or a brush, does not get caught. Accordingly, the present invention provides an automatic analysis device that is easy to use.

In the present invention, the lock receiving means 25 is provided at the front side of the safety cover 4 and the handhold portion 27, protruding rearward through the rear surface. The lock receiving means 25 is formed not in the hook shape but smoothly shaped, preventing the cleaning tool, e.g., the cloth or the brush, from getting caught. Accordingly, the present invention provides an automatic analysis device that is easy to use.

When the locking lever 35 is in substantially the T shape where the pair of locking portions 34 protrude from the support rod portion 33 to both left and right sides, the reaction force F (caused by trying to open the safety cover 4) is substantially symmetrically applied to the support rod portion 33 at left and right sides. Thus, no force to move leftward or rightward is generated with the locking lever 35. In this state, the locking lever 35 stably functions. Additionally, the support rod portion 33 is subjected largely to the tensile stress and hardly to the bending moment, and the stress generated with the locking lever 35 is relatively small. Accordingly, the present invention provides the automatic analysis device 1 with higher reliability.

The automatic analysis device 1 has the configuration where the locking portion 34 further rotates by only the angle of θ3 to move forward from the locking lever 35 in the state of standing upright. Thus, even when the safety cover 4 is in the deflected state, the locking portion 34 reliably engages with the lock receiving means 25. With this configuration, the automatic analysis device 1 is highly reliable for securely closing the safety cover 4 in the locked state.

The recessed portion 49, provided on the work surface 22 to accommodate the locking portion 34, has the one-end shape to prevent foreign substances or liquid from dropping in through the clearance. Thus, the automatic analysis device is provided in a simple structure and is highly reliable.

The locking lever 35 and the driving means 53 are covered with the frame 47 as a molded product made of, for example, the resin. The frame 47 includes the connector 54 as a single unit, the connector for externally connecting the wiring of the solenoid 41, thereby resulting in an easier assembly or replacement of the units. Accordingly, the automatic analysis device is provided in a simple structure and is highly reliable.

<Modification>

It should be noted that the present invention is not limited to the foregoing embodiments, and various modifications may be included. For example, a detailed description of each of configurations in the foregoing embodiments is to be considered in all respects as merely illustrative for convenience of description, and thus is not restrictive. A configuration of an embodiment may be partially replaced with and/or may additionally include a configuration of other embodiments. Further, any addition, removal, and replacement of other configurations may be partially made to, from, and with a configuration in each embodiment.

REFERENCE SIGNS LIST 1 automatic analyzer
2 reagent disk
3 reagent bottle
4 safety cover
5 sample transport means
6 sample dispensing means
7 chip rack (sample dispensing chip/reaction container supply means)
8 sample dispensing chip/reaction container transport means
9 incubator
10 sample dispensing chip
11 sample dispensing chip buffer
12 sample dispensing chip/reaction container waste hole
13 reaction solution stirring means
14 reaction container
15 reagent dispensing pipette
15a reagent dispensing position
16 stirring means
16a reagent stirring position
17 cleaning means
18 reaction solution aspiration nozzle
19 detecting means
20 reagent bottle loading port
21 housing
22 work surface
23 safety cover front surface
24 safety cover front side
25 lock receiving means
26 locking means
27 handhold portion 28 cover support point
29 various operation mechanism group
30 lock receiving base
31 first support shaft
32 first gear
33 support rod portion
34 locking portion
35 locking lever
36 cover portion
37 second support shaft
38 second gear
39 connecting shaft
40 connecting plate
41 solenoid
42 plunger
43 driving pin
44 first spring peg portion
45 pull spring
46 second spring peg portion
47 frame
48 cylindrical portion
49 recessed portion
50 bottom surface
51 protrusion portion
52 locking lever cover portion
53 driving means
54 connector
100 host computer

The invention claimed is:

1. An automatic analysis device comprising:
a housing that houses an analysis device;
a work surface that is an upper surface of the housing;
a cover that covers the work surface and is axially supported to be rotatable about a support shaft between a closing position and an upwardly open opening position, the support shaft being provided on one side of the housing; and
closing means for inhibiting the cover from being opened at the closing position,
wherein the closing means includes:
a protrusion portion that protrudes rearward from a front surface of the cover,
a locking lever that is axially supported to be rotatable about a rotating support shaft and inhibits the cover from being opened by rotating in a direction from the work surface toward the protrusion portion to cause an engagement portion to engage with the protrusion portion, and
driving means for driving the locking lever,
wherein in a state in which the driving means induces the engagement portion to disengage the protrusion portion, an upper surface of the locking lever is flush with the work surface, and
wherein in a state in which the driving means induces the engagement portion to engage the protrusion portion, the locking lever inhibits the cover from being opened by being in a raised state to engage with the protrusion portion.

2. The automatic analysis device according to claim 1, wherein the locking lever includes:
a support rod portion that extends in a direction away from the rotating support shaft; and
a pair of engagement portions that extend from a tip of the support rod portion to be parallel to the rotating support shaft, and provided to be substantially symmetrical to each other with respect to the support rod portion,
wherein a pair of protrusion portions, including the protrusion portion are provided to correspond to the pair of engagement portions, respectively, and
wherein the pair of engagement portions engage with the pair of protrusion portions due to an action of the driving means.

3. The automatic analysis device according to claim 1, wherein respective surfaces where the engagement portion and the protrusion portion engage with each other form an acute angle with respect to each other.

4. The automatic analysis device according to claim 1, wherein a tip protrusion provided at a tip of the protrusion portion protrudes upward.

* * * * *